(12) United States Patent
Alshaikh et al.

(10) Patent No.: US 11,536,113 B1
(45) Date of Patent: Dec. 27, 2022

(54) HOLLOW DESIGN FOR CONTROLLED RELEASE OF DOWNHOLE SENSORS

(71) Applicant: SAUDI ARABIAN OIL COMPANY, Dhahran (SA)

(72) Inventors: Abrar Alshaikh, Saihat (SA); Bodong Li, Dhahran (SA); Jianhui Xu, Dhahran (SA); Guodong Zhan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/644,294

(22) Filed: Dec. 14, 2021

(51) Int. Cl.
*E21B 34/12* (2006.01)
*E21B 34/14* (2006.01)
*F16K 15/04* (2006.01)

(52) U.S. Cl.
CPC ............ *E21B 34/14* (2013.01); *E21B 34/12* (2013.01); *F16K 15/04* (2013.01); *E21B 2200/06* (2020.05)

(58) Field of Classification Search
CPC ....... E21B 34/12; E21B 34/14; E21B 2200/06
See application file for complete search history.

(56) References Cited

U.S. PATENT DOCUMENTS

| 7,766,084 | B2 | 8/2010 | Churchill |
| 10,309,183 | B2 | 6/2019 | Cutler |
| 10,320,311 | B2 * | 6/2019 | Gooneratne ............ H02N 1/04 |
| 10,394,193 | B2 * | 8/2019 | Li ............................ E21B 47/26 |
| 10,472,908 | B2 | 11/2019 | Radford et al. |
| 2008/0007421 | A1 * | 1/2008 | Liu ....................... G01V 11/002 340/853.3 |
| 2013/0118733 | A1 * | 5/2013 | Kumar .................... E21B 47/26 166/254.2 |
| 2013/0261971 | A1 * | 10/2013 | Ramirez ................. E21B 47/12 702/6 |
| 2016/0258259 | A1 | 9/2016 | Walton et al. |
| 2017/0067312 | A1 | 3/2017 | Frazier et al. |

FOREIGN PATENT DOCUMENTS

WO 2015038096 A1 3/2015

\* cited by examiner

*Primary Examiner* — Matthew R Buck
(74) *Attorney, Agent, or Firm* — Osha Bergman Watanabe & Burton LLP

(57) ABSTRACT

A system includes a sliding sleeve, a ball landing seat, a plurality of microchips, a hydraulic piston, and a ball catcher. The sliding sleeve is made of a body with a plurality of holes and is installed within a tubular body having an exit groove. The ball landing seat is formed by the sliding sleeve. The plurality of microchips are housed in a microchip ring installed within the sliding sleeve. The hydraulic piston is installed within the microchip ring and is triggered by reception of a ball in the ball landing seat. The ball reduces a cross sectional area of a flow path when in the ball landing seat. The hydraulic piston releases the plurality of microchips through the exit groove and into the well to gather data. The ball catcher is configured to receive and hold the ball after the plurality of microchips are released into the well.

20 Claims, 21 Drawing Sheets

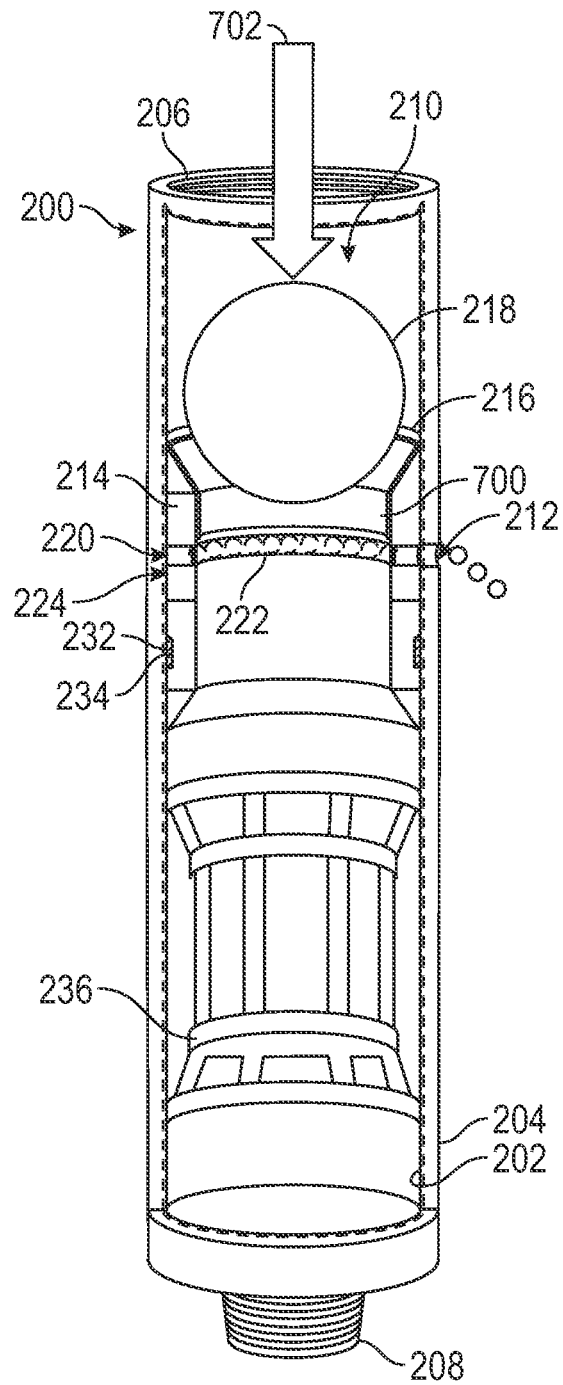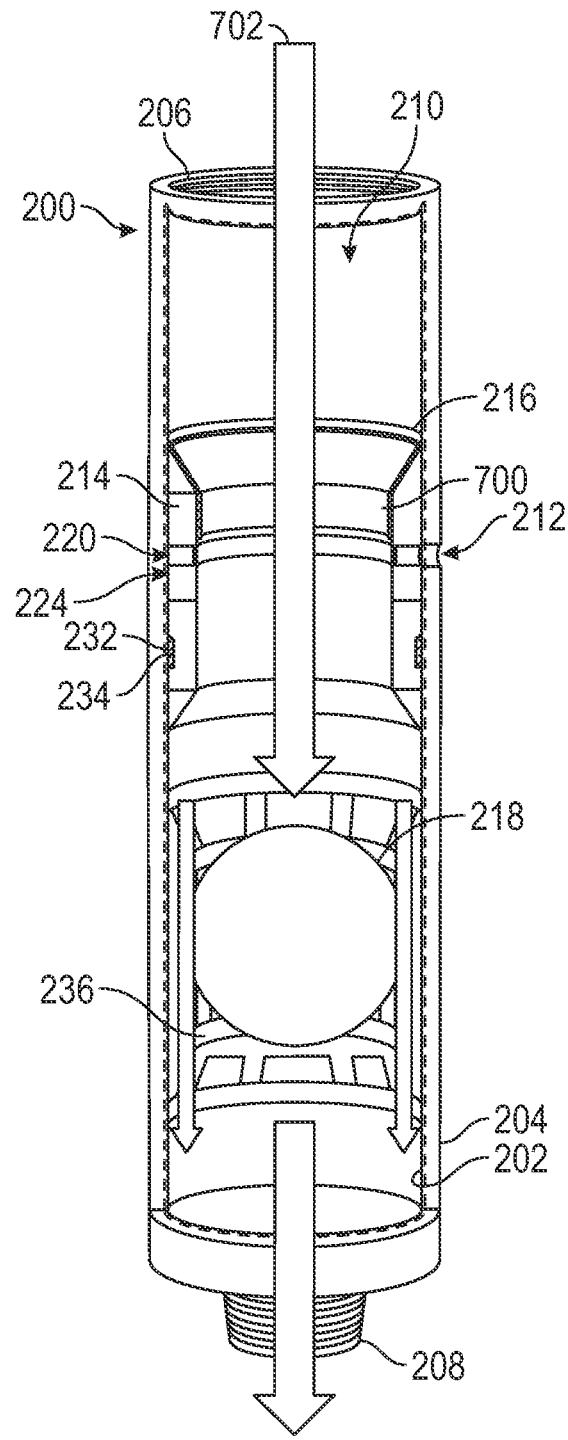
FIG. 7C
FIG. 7D

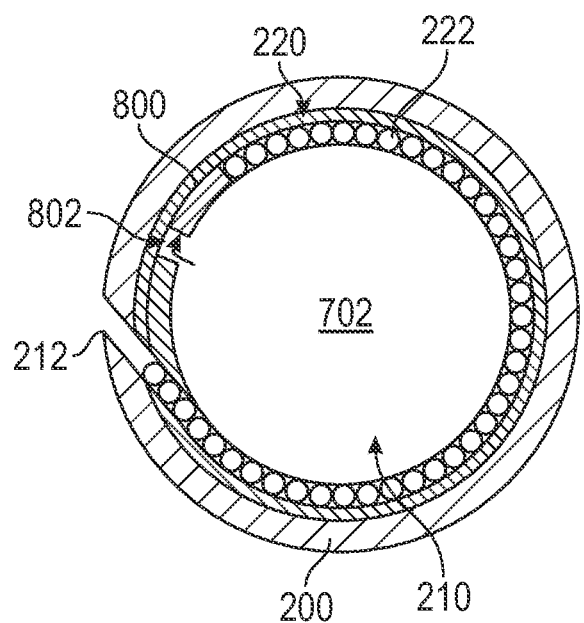 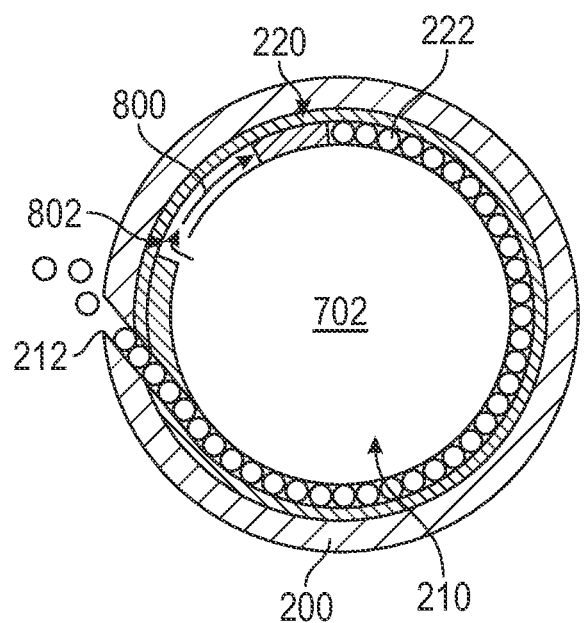
FIG. 8A    FIG. 8B
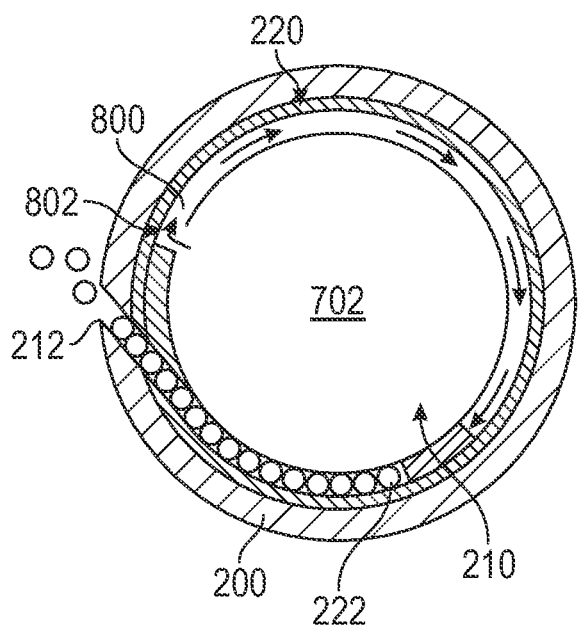 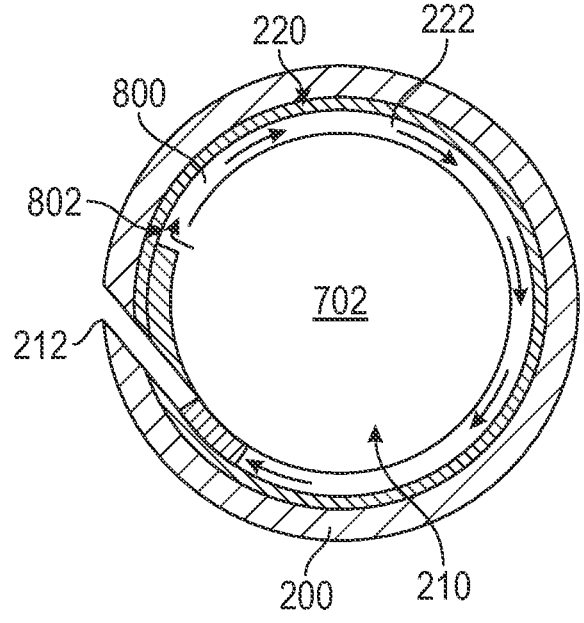
FIG. 8C    FIG. 8D

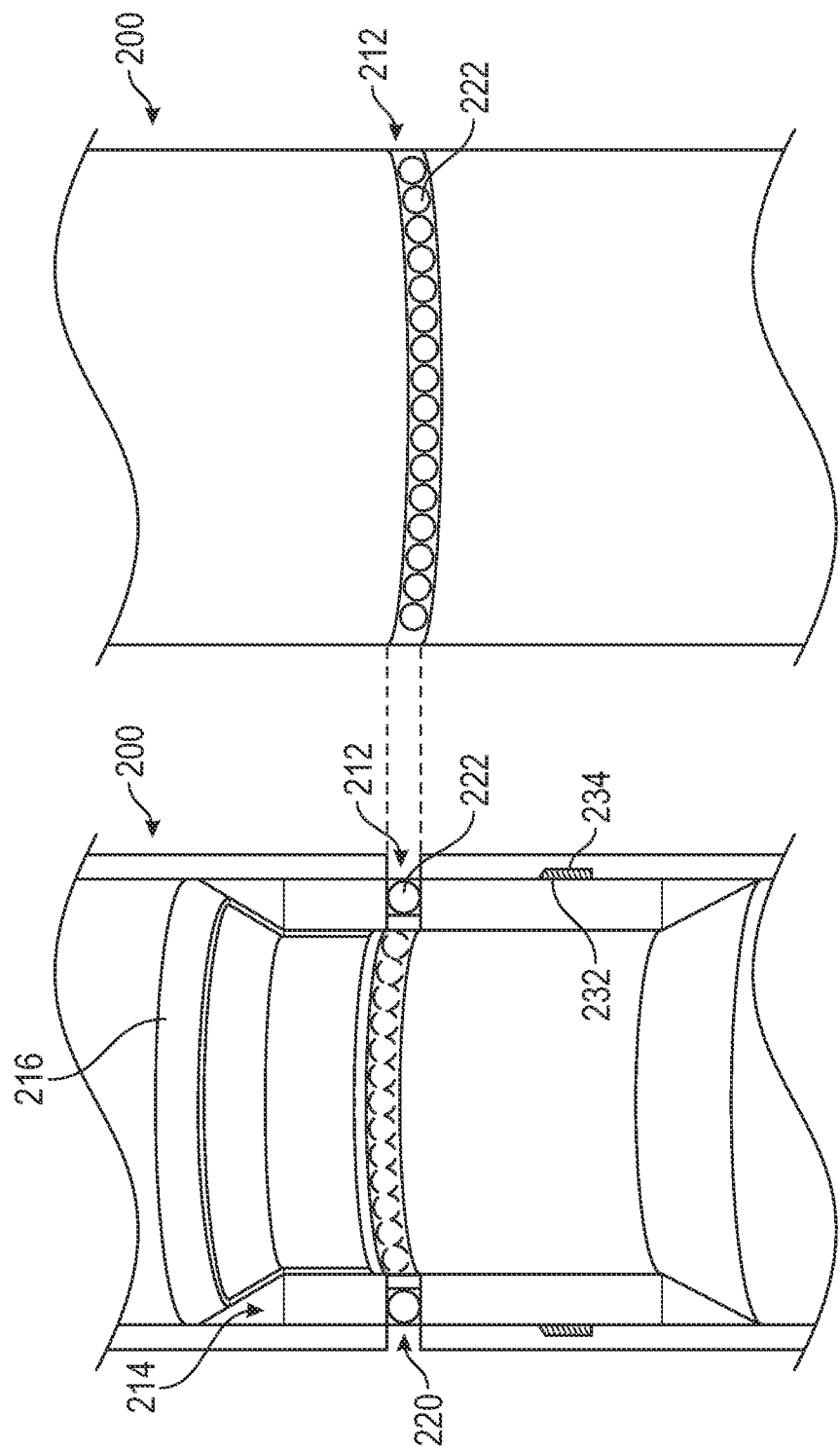

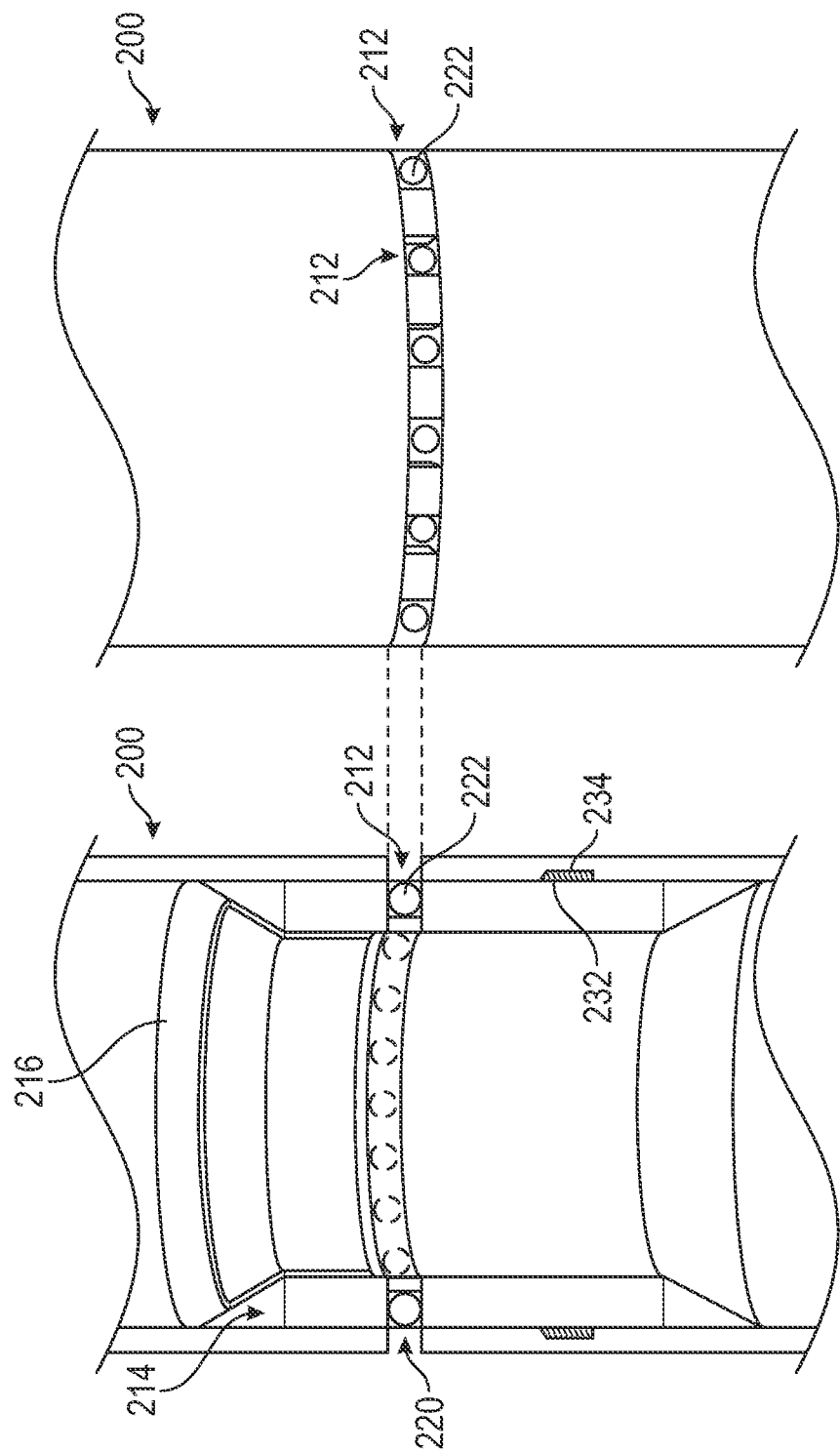

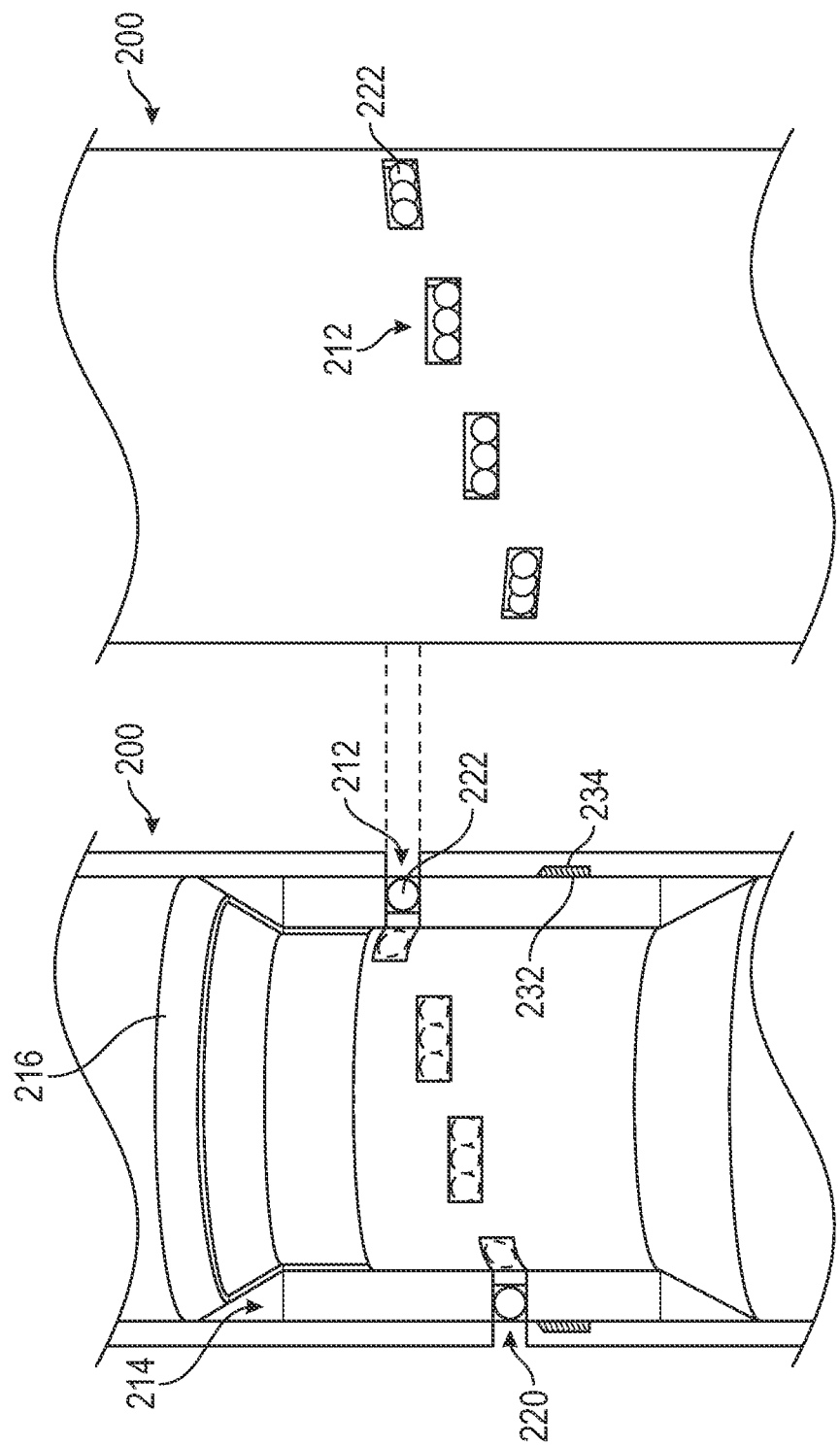

HOLLOW DESIGN FOR CONTROLLED RELEASE OF DOWNHOLE SENSORS

BACKGROUND

In the oil and gas industry, hydrocarbons are located in formations far beneath the Earth's surface. Wells are drilled into the formations to produce the hydrocarbons. During the process of drilling a well, the drill bit and the drill string encounter harsh downhole drilling conditions such as high temperature and high pressure. Estimations of temperature and pressure are required for planning and executing the well. These values are often obtained through indirect calculations using values from offset wells and are calculated using many sources of inaccuracy and error. The wellbore trajectory is another important data point that is estimated prior to completing a hole section. Typically, the wellbore trajectory is obtained after a well has been completed and a wireline survey has been run.

Drilling microchips may be used to collect downhole data such as the wellbore directional survey, the temperature profile, and the pressure profile in real time. Thus, rather than using estimations, accurate values of pressure, temperature, and wellbore trajectory may be used while drilling the well. Drilling microchips are pumped downhole, directly from the surface, using the drilling mud. The drilling microchips are pumped out of the drill bit and are recirculated to the surface where data may be pulled. However, wells can be at long as 40,000 feet, thus, drilling microchips often run out of battery by the time they reach the section of the well that is under observation. Further, drilling microchips often clog various internal components of the drill string including drill bit nozzles, the rotor/stator interface of the mud motor, etc.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for a well. The system includes a sliding sleeve, a ball landing seat, a plurality of microchips, a hydraulic piston, and a ball catcher. The sliding sleeve is made of a body with a plurality of holes and is installed within a tubular body having an exit groove. The ball landing seat is formed by the sliding sleeve. The plurality of microchips are housed in a microchip ring installed within the sliding sleeve. The hydraulic piston is installed within the microchip ring and is triggered by reception of a ball in the ball landing seat. The ball reduces a cross sectional area of a flow path when in the ball landing seat. The hydraulic piston releases the plurality of microchips through the exit groove and into the well to gather data. The ball catcher is configured to receive and hold the ball after the plurality of microchips are released into the well.

The method includes installing a sliding sleeve, made of a body with a plurality of holes, into a tubular body. The sliding sleeve has a ball landing seat, a microchip ring, a plurality of microchips, and a hydraulic piston. The method further includes pumping a ball into the ball landing seat to move the sliding sleeve, the ball reducing a cross sectional area of a flow path, triggering the hydraulic piston through movement of the sliding sleeve, releasing the plurality of microchips from the microchip ring into the well through an exit groove in the tubular body using the hydraulic piston, receiving and holding the ball in a ball catcher, and gathering data of the well using the plurality of microchips.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 7A-7D show cut away diagrams of a microchip system during different operational points in accordance with one or more embodiments.

FIGS. 8A-8D show a cross section of the tubular body (200) and microchip ring (220) in accordance with one or more embodiments.

FIGS. 14, 15A, 15B, 16A, 16B, 17A, 17B, 18A, and 18B show different configurations of the microchip ring located in the sliding sleeve in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
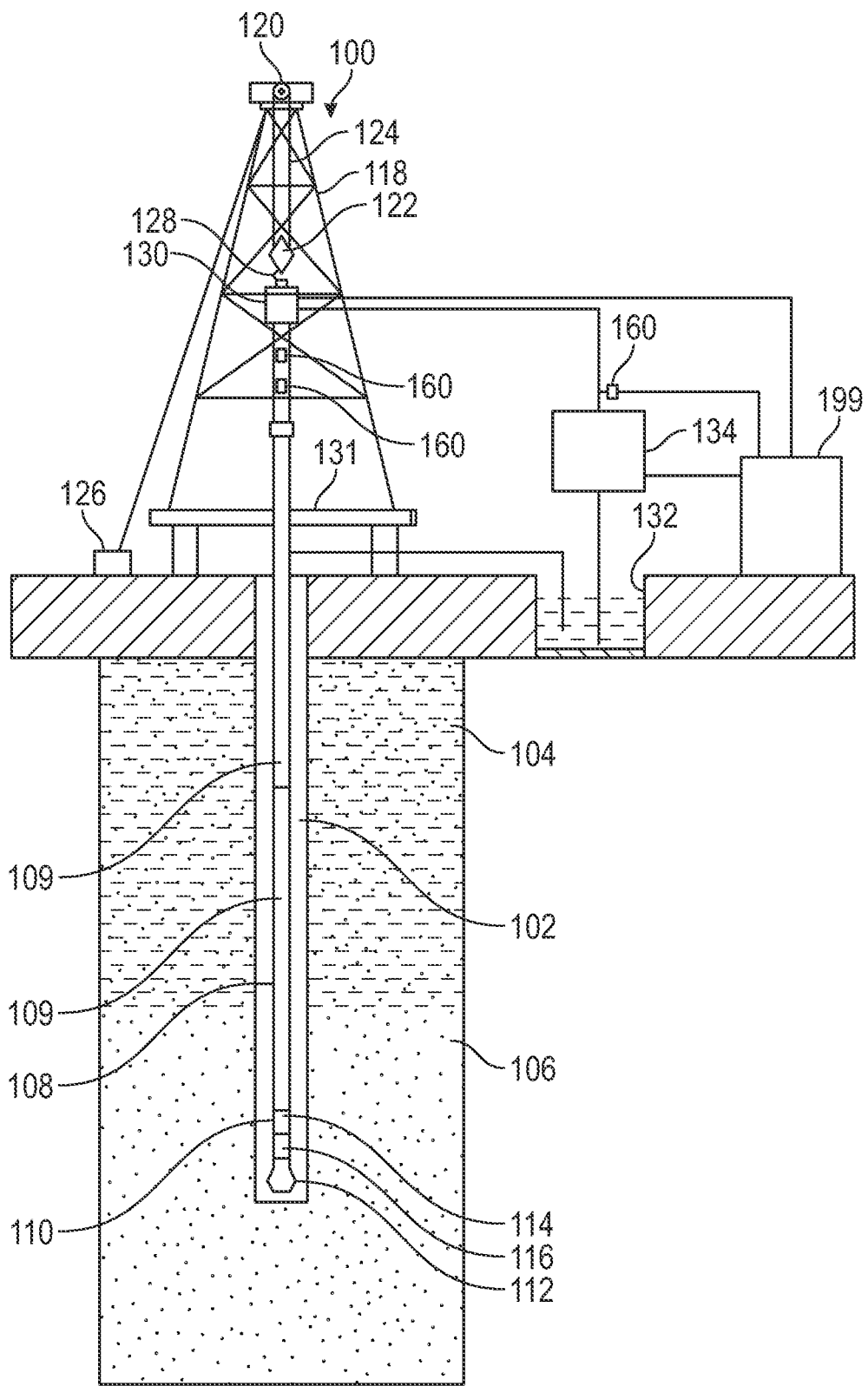
FIG. 1 shows an exemplary well site in accordance with one or more embodiments.

FIG. 1 shows an exemplary well site (100) in accordance with one or more embodiments. In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102).

The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (199) may be disposed at or communicate with the well site (100). System (199) may control at least a portion of a drilling operation at the well site (100) by providing controls to various components of the drilling operation. In one or more embodiments, system (199) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (199).

Common practice includes pumping drilling microchips downhole, directly from the surface, using the drilling mud, to collected downhole data. The drilling microchips are pumped out of the drill bit (112) and are recirculated to the surface where the data may be retrieved. However, wells may be at long as 40,000 feet, thus, drilling microchips often run out of battery by the time they reach the section of the well that is under observation. Further, drilling microchips often clog various internal components of the drill string (108) including drill bit (112) nozzles, the rotor/stator interface of the mud motor, etc.

Thus, systems and methods that allow for the microchips to be released downhole without clogging the drill string (108) and allow for the microchips to be charged while downhole are beneficial. As such, embodiments outlined below present a microchip system that may be inserted into a drill string (108) as a drilling sub. The microchip system may charge the microchips, while downhole, and may allow for the microchips to be released directly into the annulus located between the drill string (108) and the wellbore (102).

Figure 2:
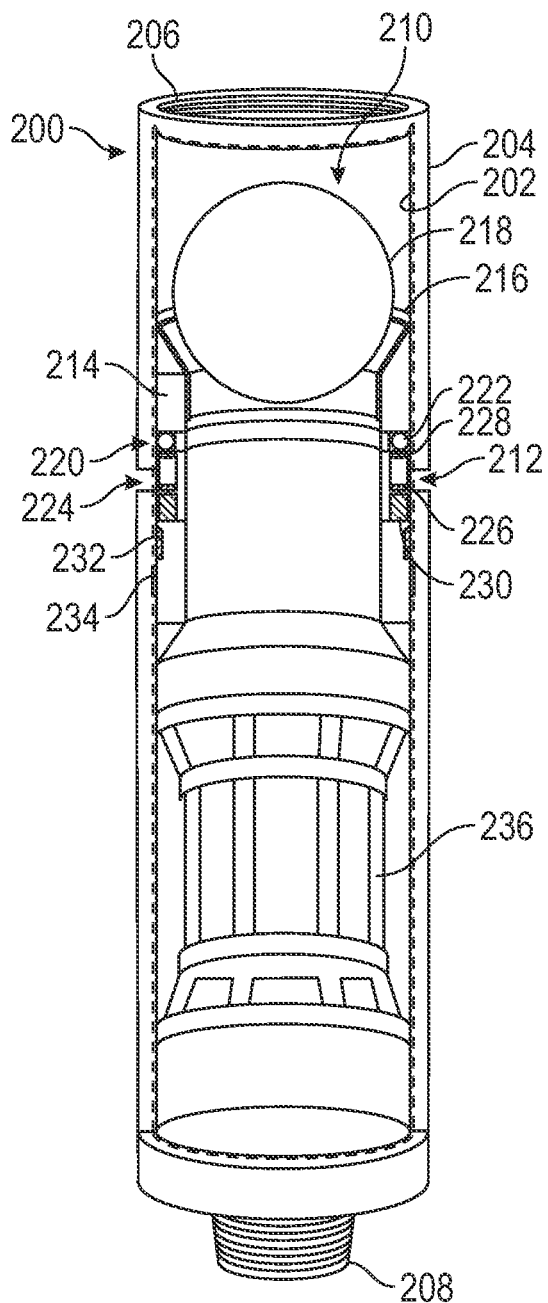
FIG. 2 shows a cut away diagram of a microchip system in accordance with one or more embodiments.

FIG. 2 shows a cut away diagram of a microchip system in accordance with one or more embodiments. The system includes a tubular body (200) having an internal circumferential surface (202) and an external circumferential surface (204). The tubular body (200) also has a box end (206) and a pin end (208). The box end (206) and the pin end (208) may mate with a corresponding box end and a corresponding pin end, respectively, of a drill string (108). The internal circumferential surface (202) defines an orifice (210) extending through the tubular body (200) from the box end (206) to the pin end (208).

An exit groove (212) may be machined into the tubular body (200), extending from the external circumferential surface (204) to the internal circumferential surface (202). The exit groove (212) may be machined in a ring-shape around the entire circumference of the tubular body (200), or the exit groove (212) may be one or more holes machined into the tubular body (200). A sliding sleeve (214) may be installed within the tubular body (200). The sliding sleeve (214) may form a ball landing seat (216) within the orifice (210) of the tubular body (200).

The ball landing seat (216) is configured to receive a ball (218). The ball (218) may be sized to fit within the orifice (210) of the tubular body (200) but also sized to be unable to pass through the ball landing seat (216) when the ball landing seat (216) is in a compressed position, as shown in FIG. 2. The ball (218) may be solid or hollow. A microchip ring (220) is installed within the sliding sleeve (214). A plurality of microchips (222) may be housed within the microchip ring (220). The microchips (222) are configured to hold a charge to gather and store data. The microchips (222) may have one or more sensors installed on each microchip (222).

Further, the microchips (222) may include different sensors from one another in order to gather different data. The sensors may be, for example, acoustic sensors, pressure sensors, vibration sensors, accelerometers, gyroscopic sensors, magnetometer sensors, and temperature sensors. The data gathered by the sensors on the microchips (222) may be stored in the microchips (222). When the microchips (222) reach a surface location, the data may be obtained from the microchips (222). In one or more embodiments, the microchip ring (220) may be installed adjacent to a charging ring (224) in the sliding sleeve (214).

The microchip ring (220) and the charging ring (224) are electronically connected to one another. Further, the microchips (222) may be electronically connected to the microchip ring (220) and, thus, the charging ring (224). The microchips (222) are charged by the charging ring (224). The charging ring (224) includes a circuit (226), a power source, and a charging coil (228). As shown in FIG. 2, the power source may be a battery (230). The battery (230) may be charged by any means known in the art prior to installation in the tubular body (200). The charging coil (228) may be disposed adjacent to the microchip ring (220) within the sliding sleeve (214). In one or more embodiments, the circuit (226) is located between the charging coil (228) and the battery (230) within the charging ring (224). The circuit (226) is further outlined in FIG. 5.

A key (232) is located on the sliding sleeve (214) between the sliding sleeve (214) and the tubular body (200). In accordance with one or more embodiments, the key (232) may be a metal ring that juts out or protrudes from the sliding sleeve (214). The tubular body (200) has a key seat (234) machined into the internal circumferential surface (202). The key seat (234) is configured to receive the key (232). When the sliding sleeve (214) is installed in the tubular body (200), the key (232) may be located up hole from the key seat (234), as shown in FIG. 2. Further, the microchip ring (220) may be located up hole from the exit groove (212) on the tubular body (200).

When the key (232) is in the position as shown in FIG. 2, the key (232) presses against the internal circumferential surface (202) of the tubular body (200) to compress the sliding sleeve (214) and the ball landing seat (216). As explained above, the ball (218) is sized to be larger than the ball landing seat (216) when the sliding sleeve (214) and the ball landing seat (216) are in the compressed position. After reception of the ball (218) in the ball landing seat (216), a fluid, such as a drilling mud, may be pumped onto the ball (218). Because the ball (218) is larger than the ball landing seat (216) in the compressed position, the fluid is unable to pass through the orifice (210) and a pressure is exerted onto the sliding sleeve (214).

The drilling mud, and associated pressure, pushes the ball (218) and the sliding sleeve (214) downhole within the tubular body (200) until the key (232) is received by the key seat (234). When the key (232) engages with the key seat (234), the sliding sleeve (214) may become uncompressed, and the size of the ball landing seat (216) may increase. The ball (218) may be sized to be smaller than the ball landing seat (216) when the ball landing seat (216) is in the uncompressed position, thus, the ball (218) may pass through the ball landing seat (216). Further, when the key seat (234) receives the key (232), the microchip ring (220) lines up with the exit groove (212) and the microchips (222) may be able to exit the sliding sleeve (214) and tubular body (200) through the exit groove (212).

In accordance with one or more embodiments, the ball (218) may be received in a ball catcher (236) located downhole from the sliding sleeve (214) within the tubular body (200). The ball catcher (236) may be a cage that is configured to hold the ball (218) but also allow the fluid to pass by the ball (218) and the ball catcher (236). The sliding sleeve (214), tubular body (200), ball (218), and ball catcher (236) may be made out of any suitable material, such as steel.

Figure 3:
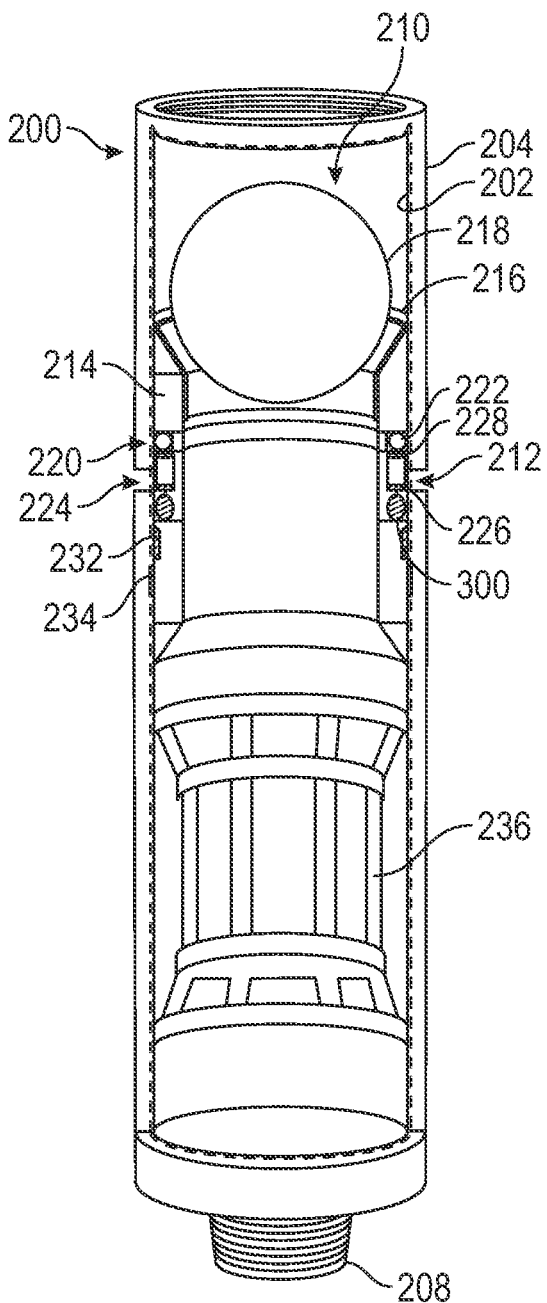
FIG. 3 shows a cut away diagram of a microchip system in accordance with one or more embodiments.

FIG. 3 shows a cut away diagram of a microchip system in accordance with one or more embodiments. Components of FIG. 3 that are the same as or similar to components shown in FIG. 2 have not been redescribed for purposes of readability and have the same function and purpose as described above. The microchip system shown in FIG. 3 includes a sliding sleeve (214) installed within a tubular body (200). The sliding sleeve (214) is shown in the compressed position with a ball (218) landed out on the ball landing seat (216) of the sliding sleeve (214).

The charging ring (224) shown in FIG. 3 uses a piezoelectric generator (300) as the power source for charging the microchips (222) in the microchip ring (220). The piezoelectric generator (300) may include piezoelectric material that may be activated by movement of any component such as the tubular body (200), the sliding sleeve (214), a downhole mud motor, a downhole fluid pulse generator, etc. Activation of the piezoelectric material creates power in the piezoelectric generator (300) that may be transferred to the microchips (222) to charge the microchips (222) using the charging coil (228) and the circuit (226) in the charging ring (224).

Figure 4:
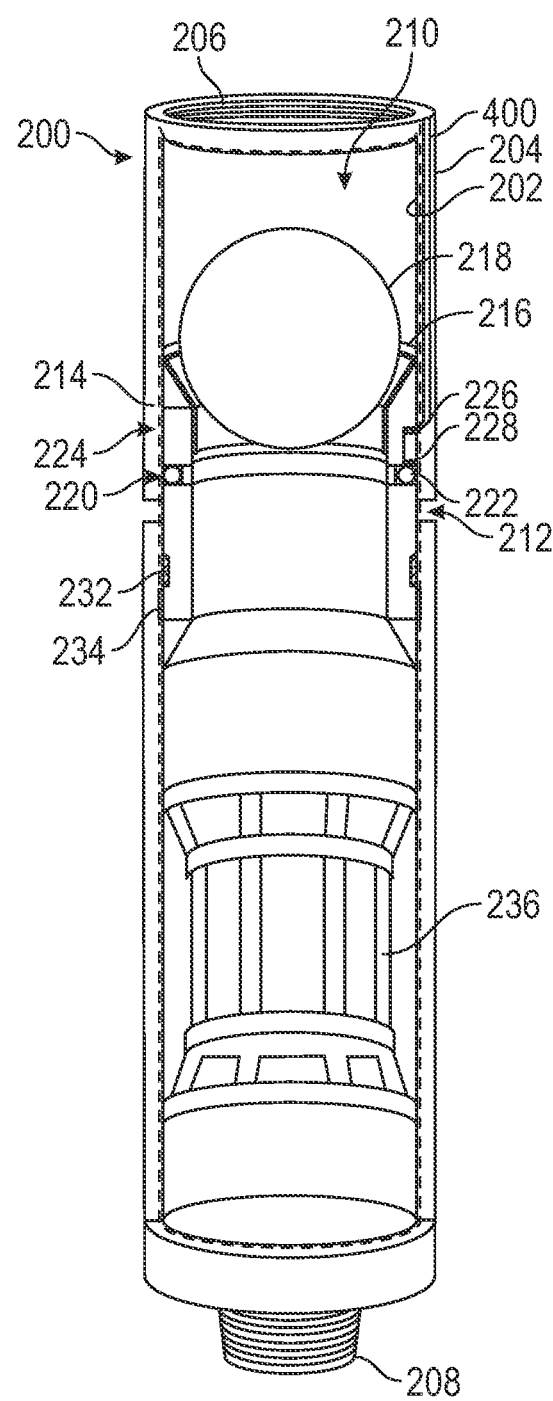
FIG. 4 shows a cut away diagram of a microchip system in accordance with one or more embodiments.

FIG. 4 shows a cut away diagram of a microchip system in accordance with one or more embodiments. Components of FIG. 4 that are the same as or similar to components shown in FIGS. 2 and 3 have not been redescribed for purposes of readability and have the same function and purpose as described above. The microchip system shown in FIG. 4 includes a sliding sleeve (214) installed within a tubular body (200). The sliding sleeve (214) is shown in the compressed position with a ball (218) landed out on the ball landing seat (216) of the sliding sleeve (214).

The tubular body (200) may be made out of wired drill pipe (400). Wired drill pipe (400) is pipe that is able to transfer energy and communications through imbedded wires in the wall of the pipe. Thus, the wired drill pipe (400) is able to transfer energy to the charging ring (224) from outside the system. In accordance with one or more embodiments, the tubular body (200) may be installed within a drill string (108) also made of wired drill pipe (400). The drill string (108) and the tubular body (200) may be deployed in a wellbore (102).

The wired drill pipe (400) of the tubular body (200) may be electronically connected to the wired drill pipe (400) of the drill string (108) due to the mechanical connection between the two components. The wired drill pipe (400) may be connected to a generator (not pictured) at a surface location. The surface location may be any location located on the surface of the Earth. The generator may transfer power, using the wired drill pipe (400), from the surface location to the charging ring (224) located in the sliding sleeve (214).

Specifically, the wired drill pipe (400) of the tubular body (200) may be physically and electronically connected to the circuit (226) of the charging ring (224). Thus, the energy is transferred from the wired drill pipe (400) to the circuit (226). As the circuit (226) is connected to the charging coil (228), the energy may then be transferred from the circuit (226) to the charging coil (228). The charging coil (228) may then transfer the energy to the microchips (222). Thus, the wired drill pipe (400) is able to charge the microchips (222) while the microchips (222) are located in the microchip ring (220).

Figure 5:
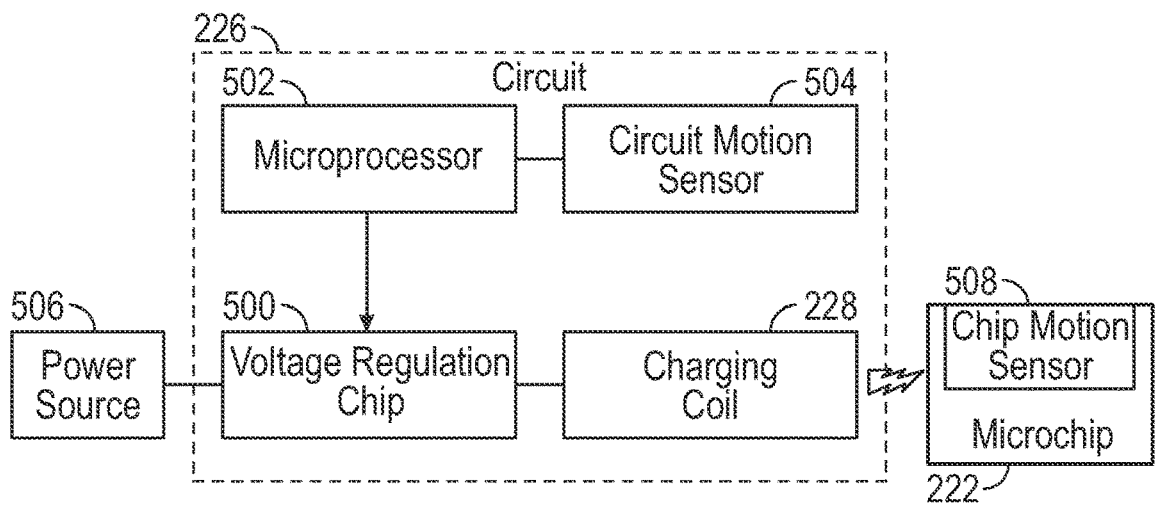
FIG. 5 shows a charging and initiation circuit for the microchip system in accordance with one or more embodiments.

FIG. 5 shows a charging and initiation circuit (226) for the microchip system in accordance with one or more embodiments. Components of FIG. 5 that are the same as or similar to components shown in FIGS. 2-4 have not been redescribed for purposes of readability and have the same function and purpose as described above. The circuit (226) may be located on a printed circuit board. The circuit (226) may include a voltage regulation chip (500), a microprocessor (502), and a circuit motion sensor (504). A power source (506) may be connected to the voltage regulation chip (500) in the circuit (226). The voltage regulation chip (500) may be an integrated circuit that provides a constant fixed output voltage regardless of a change in the load or the input voltage coming from the power source (506).

The power source (506) may be a battery (230) as described in FIG. 2, a piezoelectric generator (300) as described in FIG. 3, or wired drill pipe (400) as described in FIG. 4. In other embodiments, a downhole electronic cable, such as an electronic cable used in electric submersible pump applications, may be connected to a generator at the surface location and to the charging ring (224) in the tubular body (200). The downhole electric cable is separate from the drill string (108), i.e., not embedded into the drill string (108), and may transfer energy from the generator at the surface location to the charging ring (224) to charge the microchips (222).

The microprocessor (502) is used to control the voltage regulation chip (500) to provide a charging strategy if needed. The circuit motion sensor (504) may provide an input signal to the microprocessor (502) based off of the sliding motion of the sliding sleeve (214). Upon reception of the input signal, the microprocessor (502) may send an initiation signal to the microchips (222), or the microchip ring (220), through the wireless interface between the circuit (226) and the microchip ring (220). The reception of the initiation signal at the microchip ring (220) may trigger the microchip ring (220) to release the plurality of microchips (222).

In accordance with one or more embodiments, the circuit motion sensor (504) may include an accelerometer. The accelerometer may be electronically connected to the microchip ring (220). The accelerometer may be able to measure the acceleration of the sliding sleeve (214) to activate the microchips (222) to change from a sleep mode to an active mode. The sleep mode may be defined as when the microchips (222) are not gathering data, and the active mode may be defined as when the microchips (222) are gathering data.

In other embodiments, the microprocessor (502) may activate the microchips (222) to change from the sleep mode to the active mode upon a drop in a charging voltage across the circuit (226). The drop in the charging voltage may be detected by a chip motion sensor (508) located on-board each microchip (222).

Figure 6:
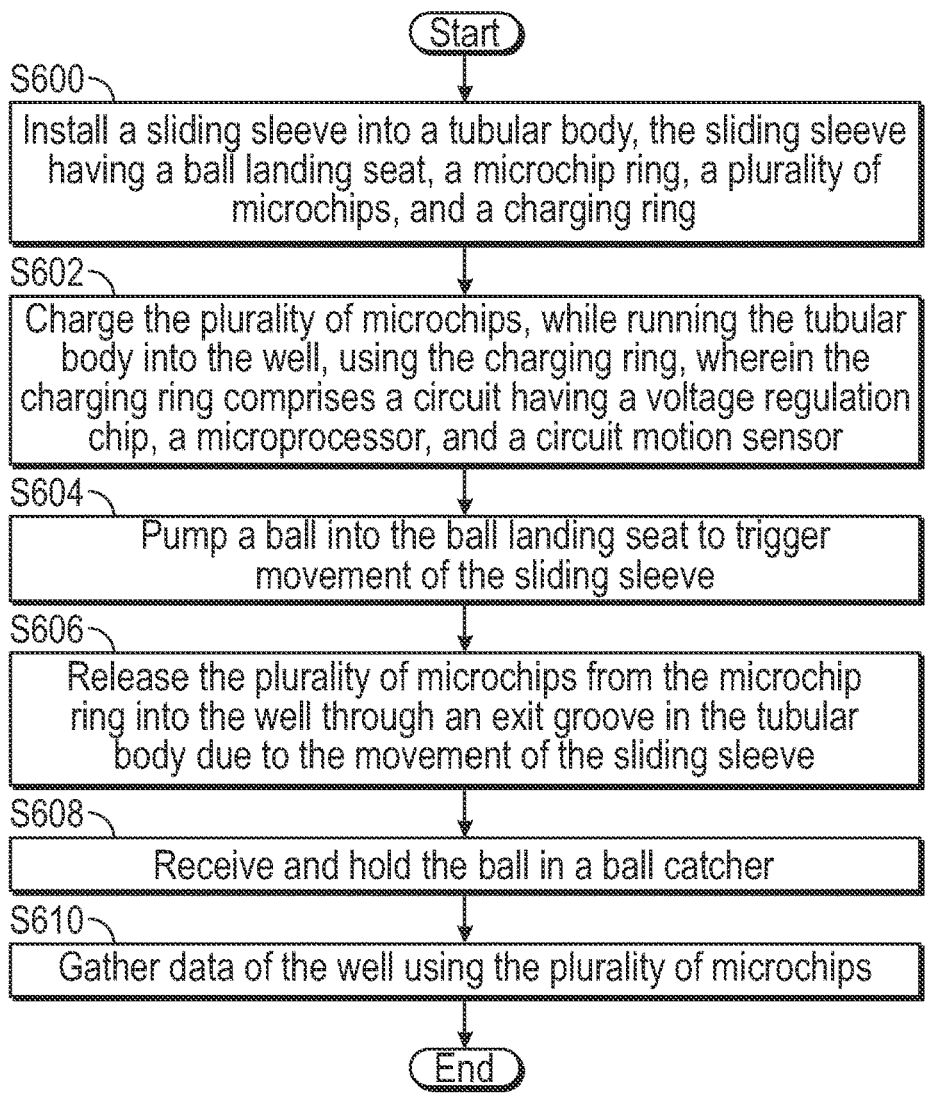
FIG. 6 shows a flowchart in accordance with one or more embodiments.

FIG. 6 shows a flowchart in accordance with one or more embodiments. The flowchart outlines a method for gathering data about a well. The well may be a wellbore (102) as described in FIG. 1, or any other structure drilled into the surface of the Earth without departing from the scope of the disclosure herein. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a sliding sleeve (214) is installed into a tubular body (200), and the sliding sleeve (214) has a ball landing seat (216), a microchip ring (220), a plurality of microchips (222), and a charging ring (224) (S600). The sliding sleeve (214) may be installed into the tubular body (200) using any means known in the art such as aligning the sliding sleeve onto tracks (not pictured) machined into the internal circumferential surface (202) of the tubular body (200). The microchip ring (220) may house the plurality of microchips (222) and the charging ring (224) may be disposed near the microchip ring (220) and microchips (222) such that one or more charging coils (228) of the charging ring (224) are adjacent the microchips (222).

The plurality of microchips (222) are charged while running the tubular body (200) into the well using the charging ring (224), and the charging ring (224) includes a circuit (226) having a voltage regulation chip (500), a microprocessor (502), and a circuit motion sensor (504) (S602). A power source (506), such as a battery (230), piezoelectric generator (300), wired drill pipe (400), or a downhole electronic cable, may be connected to the voltage regulation chip (500). Energy is transferred from the power source (506) to the circuit (226) through the voltage regulation chip (500).

The sliding sleeve (214) may be in the compressed position, as shown in FIGS. 2-4, while being run into the well. A ball (218) is pumped into the ball landing seat (216) to trigger movement of the sliding sleeve (214) (S604). The movement of the sliding sleeve (214) may be triggered by pumping a fluid onto the ball (218) while the ball (218) is in the ball landing seat (216). The pressure applied to the sliding sleeve (214) through the ball (218) and the ball landing seat (216) pushes the sliding sleeve (214) downhole, within the tubular body (200), until a key (232) of the sliding sleeve (214) enters a key seat (234) of the tubular body (200).

As the key seat (234) receives the key (232), the microchip ring (220) aligns with the exit groove (212) and the plurality of microchips (222) are released from the microchip ring (220) into the well through the exit groove (212) in the tubular body (200) (S606). Further, the key (232) entering the key seat (234) allows the sliding sleeve (214) to be uncompressed which increases the size of the ball landing seat (216). The size increase allows the ball (218) to be pushed through the sliding sleeve (214) into a ball catcher (236) that receives and holds the ball (218) (S608).

In accordance with one or more embodiments, the microchips (222) may be in a sleep mode while the tubular body (200) is being run into the well. When the sliding sleeve (214) is pushed downhole within the tubular body (200) by the ball (218) and the fluid, a circuit motion sensor (504), such as an accelerometer, located on the circuit (226) senses the movement of the sliding sleeve (214). The movement of the sliding sleeve (214) may trigger the circuit motion sensor (504) to send an initiation signal to the microprocessor (502), and the microprocessor (502) may activate the microchips (222) to change from the sleep mode to an active mode. The active mode may "turn on" the microchips (222) allowing the microchips (222) to gather and store data. In other embodiments, the microchips (222) may be activated to change from the sleep mode to the active mode due to a drop in charging voltage across the microprocessor (502).

As such, when the microchips (222) are activated and released into the wellbore (102), data associated with the well is gathered using the plurality of microchips (222) (S610). In accordance with one or more embodiments, the microchips (222) are released into the annulus, located between the drill string (108) and the wellbore (102), into the drilling mud. The drilling mud circulates the microchips (222) from the bottom of the wellbore (102) to a surface location, such as mud pits (132). The microchips (222) may be gathered at the surface location and the data may be retrieved from the microchips (222) using a microchip reader.

FIGS. 7a-7d show cut away diagrams of a microchip system during different operational points in accordance with one or more embodiments. Components in FIGS. 7a-7d that are the same as or similar to components shown in the previous figures have not been redescribed for purposes of readability and have the same function and purpose as described above.

Figure 7A:
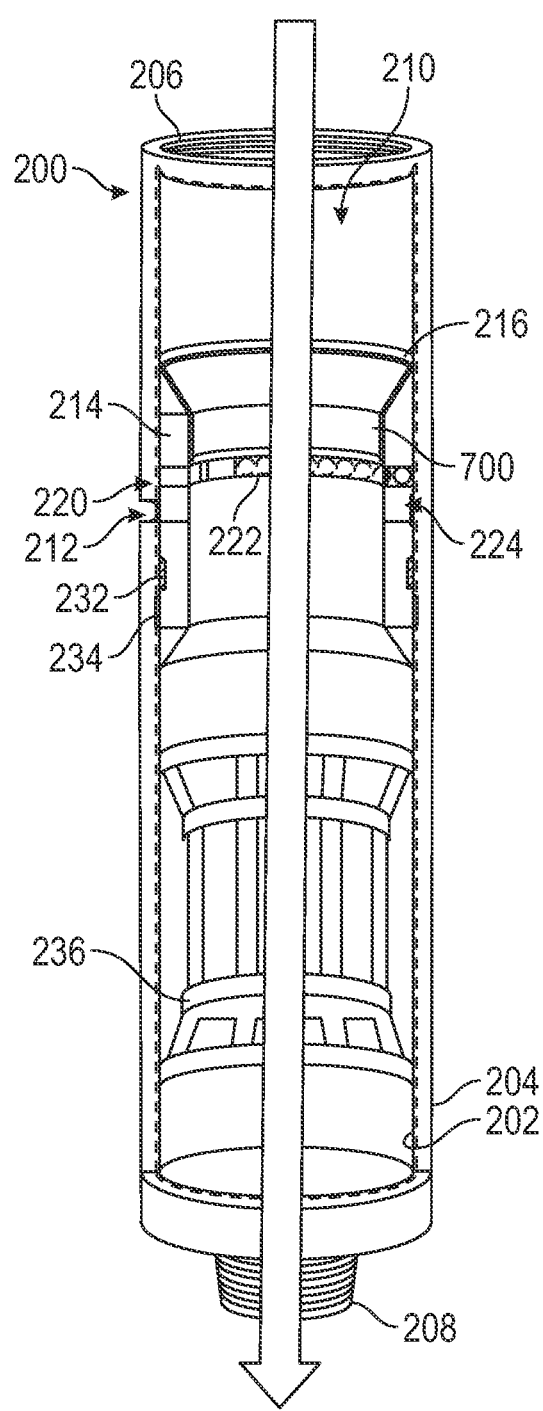

Specifically, FIG. 7a shows the sliding sleeve (214) installed within the tubular body (200) and in a first position. The sliding sleeve (214) may include a charging ring (224) and a microchip ring (220) having a plurality of microchips (222). The charging ring (224) may charge and activate the microchips (222). The first position is defined when the sliding sleeve (214) is within the tubular body (200), but the key (232) is not located in the key seat (234). In accordance with one or more embodiments, the first position may be the compressed position as described above. The sliding sleeve (214) as shown in FIGS. 7a-7d, is formed in a cylindrical shape and has the orifice (210) extending through the sliding sleeve (214), but the sliding sleeve (214) has a solid wall body (700). That is, there are no openings or holes within the body of the sliding sleeve (214).

As shown in FIG. 7a, a fluid (702) is able to be pumped through the orifice (210) of the tubular body (200) and the sliding sleeve (214) due to the absence of a ball (218) in the ball landing seat (216). Herein, the fluid (702) maybe any fluid known in the art, such as water, drilling mud, completions fluid, etc. The first position of the system may be the position that the system is in when the system is installed into a drill string (108) and run into the wellbore (102) as described above.

Figure 7B:
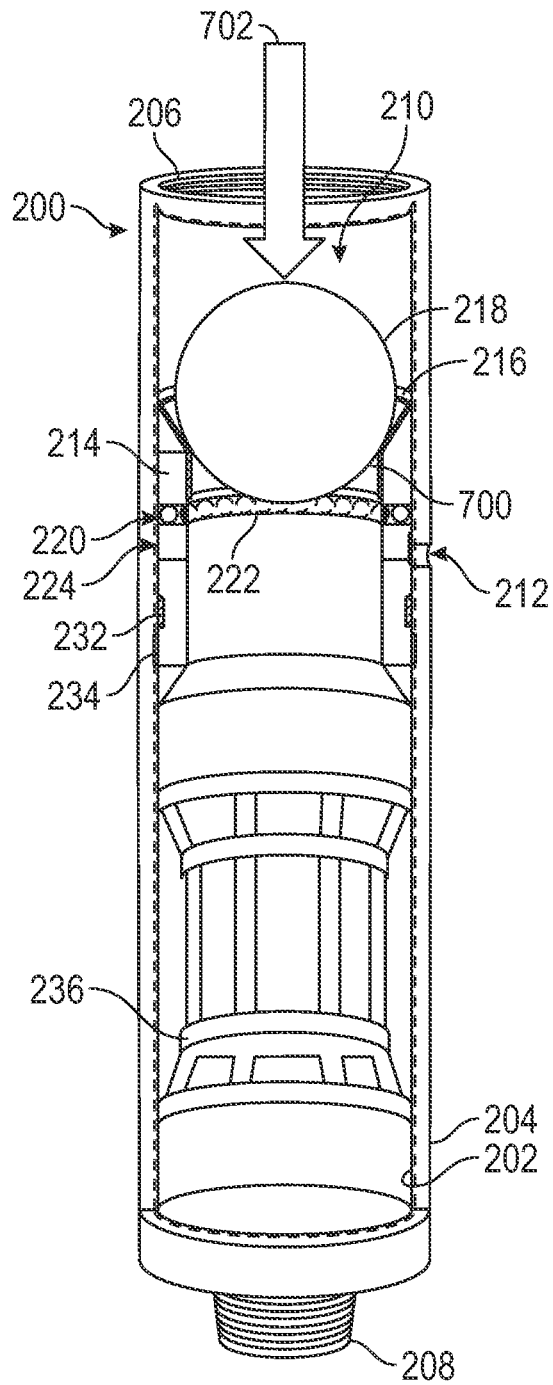

FIG. 7b shows the system in the first position, but after a ball (218) has been landed into the ball landing seat (216). Once the ball (218) has landed into the ball landing seat (216), the fluid (702) is unable to be pumped through the orifice (210) and the fluid (702) is unable to pass through the sliding sleeve (214) due to the solid wall body (700) of the sliding sleeve (214). In other words, the ball (218) blocks a flow path of the fluid (702) through the orifice (210) of the sliding sleeve (214) and the tubular body (200). However, the fluid (702) may continue to be pumped onto the ball (218) to apply a pressure to the sliding sleeve (214).

The fluid (702) pressure may push the sliding sleeve (214) downhole, within the tubular body (200), until the key (232) enters the key seat (234). In accordance with one or more embodiments, one or more tracks (not pictured) are machined into the internal circumferential surface (202) of the tubular body (200) and the sliding sleeve (214) is movably installed on the track(s) and the sliding sleeve (214) may move along the track(s) due to the fluid (702) pressure.

FIG. 7c shows the sliding sleeve (214) in the second position within the tubular body (200) and the ball (218) located in the ball landing seat (216). The second position is defined when the key (232) is located within the key seat (234). The interaction between the key (232) and the key seat (234) prevents any auxiliary movement of the sliding sleeve (214) within the tubular body (200). In accordance with one or more embodiments, the second position may be the uncompressed position as described above.

The second position further comprises the microchip ring (220) lined up with the exit groove (212) in the tubular body (200). When the microchip ring (220) is lined up with the exit groove (212), the plurality of microchips (222) may exit the microchip ring (220) and the tubular body (200) into an external environment of the tubular body (200), such as the wellbore (102). In further embodiments, the microchip ring (220) may include a hydraulic piston (800) that uses the fluid (702) to push the microchips (222) out of the microchip ring (220) and into the wellbore (102). The microchip ring (220) and hydraulic piston (800) are further outlined in FIGS. 8a-8d FIG. 7d shows the sliding sleeve (214) in the second position in the tubular body (200) and shows the ball (218) located in the ball catcher (236). In accordance with one or more embodiments, when the sliding sleeve (214) becomes uncompressed due to the key (232) entering the key seat (234), the sliding sleeve (214) may decompress and increase the size of the ball landing seat (216) such that the fluid (702) may push the ball (218) through the ball landing seat (216) and into the ball catcher (236).

In other embodiments, the key (232) may be located flush within the sliding sleeve (214) until the key (232) lines up with the key seat (234). When the key (232) lines up with the key seat (234) due to the movement of the sliding sleeve (214), the key (232) juts out of the sliding sleeve (214) and enters the key seat (234). In this scenario, the size of the sliding sleeve (214) does not change. As such, there may be a breakable ledge (not pictured) located within the ball landing seat (216) of the sliding sleeve (214).

The ball (218) may be smaller than the orifice (210) of the sliding sleeve (214) but larger than the hole created by the ledge, thus the ball (218) rests on the ledge when the ball (218) seats on the ball landing seat (216). The ledge may be sheared when a large enough pressure is applied onto the ball (218) while located on the ledge. When the ledge shears, the ball (218) is able to pass through the orifice (210) of the sliding sleeve (214) and the tubular body (200). The ball (218) may be caught by the ball catcher (236) as shown in FIG. 7d. However, in the absence of a ball catcher (236), the ball (218) may rest within the tubular body (200) for the duration of the operation without departing from the scope of the disclosure herein.

FIGS. 8a-8d show a cross section of the tubular body (200) and microchip ring (220) in accordance with one or more embodiments. Specifically, a hydraulic piston (800) is installed within the microchip ring (220) and FIGS. 8a-8d show the hydraulic piston (800) undergoing an operation. Components in FIGS. 8a-8d that are the same as or similar to components shown in the previous figures have not been redescribed for purposes of readability and have the same function and purpose as described above.

The hydraulic piston (800) may be triggered by reception of the ball (218) in the ball landing seat (216). More specifically, as the pressure is applied to the ball (218) in the ball landing seat (216), the sliding sleeve (214) moves within the tubular body (200) to align the microchip ring (220) with the exit groove (212) of the tubular body (200), as shown in FIG. 8a. When the microchip ring (220) is aligned with the exit groove (212), the microchips (222) are able to exit the microchip ring (220) and create or enlarge an opening (802) in the hydraulic piston (800).

The fluid (702) applies a pressure against the hydraulic piston (800) to move the hydraulic piston (800), enlarge the opening (802), and push the plurality of microchips (222) out of the exit groove (212) as shown in FIGS. 8b and 8c. In further embodiments, the hydraulic piston (800) may push the microchips (222) out of the microchip ring (220) in a clockwise direction when viewing the microchip ring (220) from the direction of the ball landing seat (216). FIG. 8d shows the microchip ring (220) after all of the microchips (222) have exited the microchip ring (220) through the exit groove (212).

Figure 9:
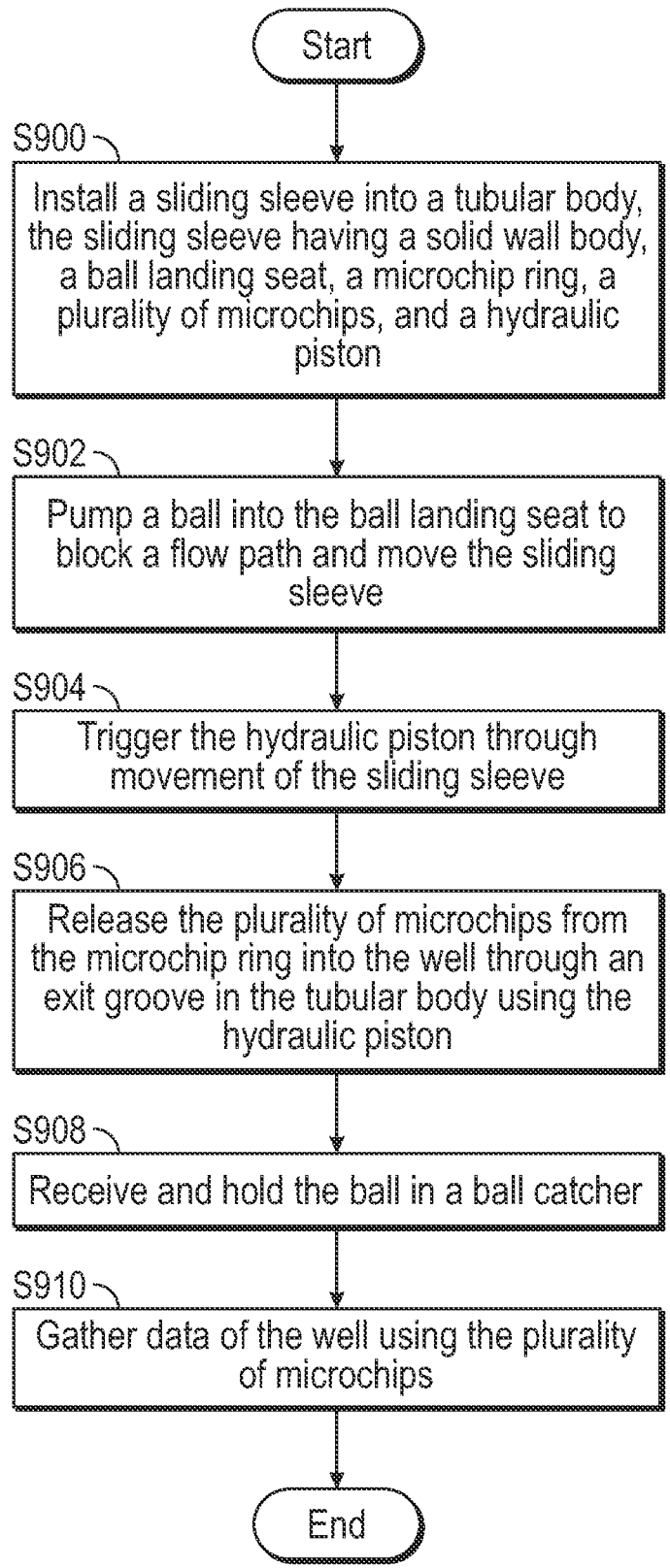
FIG. 9 shows a flowchart in accordance with one or more embodiments.

FIG. 9 shows a flowchart in accordance with one or more embodiments. The flowchart outlines a method for gathering data about a well. The well may be a wellbore (102), as described in FIG. 1, or the well may be any other structure drilled into the surface of the Earth without departing from the scope of the disclosure herein. While the various blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a sliding sleeve (214) is installed into a tubular body (200), and the sliding sleeve has a solid wall body (700), a ball landing seat (216), a microchip ring (220), a plurality of microchips (222), and a hydraulic piston (800) (S900). The sliding sleeve (214) may be installed into one or more tracks machined into the tubular body (200). The tubular body (200), with the sliding sleeve (214), may be installed as part of a drill string (108) using the pin end (208) and the box end (206). The hydraulic piston (800) may be a part of the microchip ring (220) and the microchips (222) may initially be located within the microchip ring (220).

A ball (218) may be pumped into the ball landing seat (216) to block a flow path and move the sliding sleeve (214) (S902). With the flow path being blocked, the fluid (702) is able to apply a pressure on the ball (218) and the sliding sleeve (214). The pressure pushes the sliding sleeve (214) within the tubular body (200). The hydraulic piston (800) is triggered by the movement of the sliding sleeve (214) (S904). More specifically, the sliding sleeve (214) aligns the microchip ring (220) with the exit groove (212) in the tubular body (200), thus, the microchips (222) are able to exit the microchip ring (220) into an external environment. As the microchips (222) are free to exit the microchip ring (220), an opening (802) in the hydraulic piston (800) is able to be filled with a fluid (702) and fluid (702) pressure may build.

The build in fluid (702) pressure may enlarge the opening (802). As fluid (702) pressure builds up and enlarges the opening (802), the hydraulic piston (800) pushes against the microchips (222) and the plurality of microchips (222) are released from the microchip ring (220) into the well through the exit groove (212) in the tubular body (200) (S906). Further, as the sliding sleeve (214) moves within the tubular body (200), a key (232), located on the sliding sleeve (214), may enter a key seat (234) in the tubular body (200).

The ball (218) may pass through the sliding sleeve (214) due to the decompression of the sliding sleeve (214) or due to the shearing of the ledge as described above. After the ball (218) passes through the sliding sleeve (214), the ball (218) is received and held in a ball catcher (236) (S908). After the microchips (222) exit the microchip ring (220), the microchips (222) gather data of the well (S910). The well data gathered may be any data that can be obtained by a sensor, such as temperature, pressure, 3D survey data, etc. The data may be retrieved from the microchip (222) when the microchip (222) reaches the surface location with the mud returns.

FIGS. 10a-10d show cut away diagrams of a microchip system during different operational points in accordance with one or more embodiments. Components in FIGS. 10a-10d that are the same as or similar to components shown in the previous figures have not been redescribed for purposes of readability and have the same function and purpose as described above.

Figure 10A:
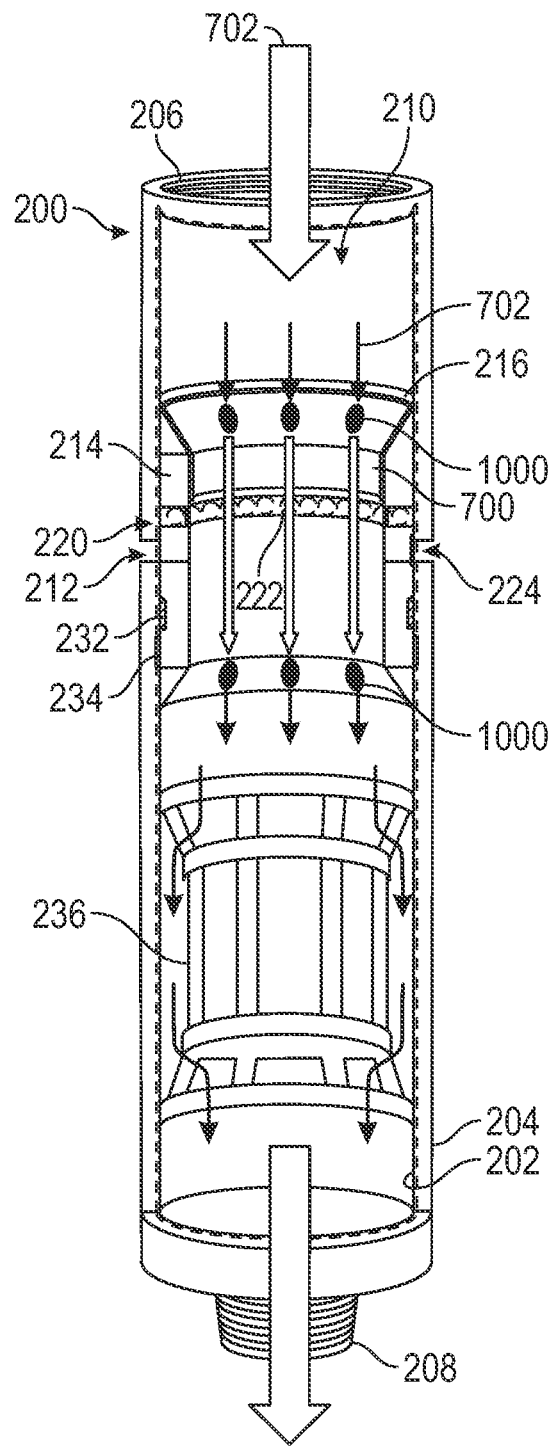
FIGS. 10A-10D show cut away diagrams of a microchip system during different operational points in accordance with one or more embodiments.

Specifically, FIG. 10a shows the sliding sleeve (214) installed within the tubular body (200) and in the first position. The sliding sleeve (214) may include a charging ring (224) and a microchip ring (220) having a plurality of microchips (222). The charging ring (224) may charge and activate the microchips (222). The sliding sleeve (214) as shown in FIGS. 10a-10d, is formed in a cylindrical shape and has the orifice (210) extending through the sliding sleeve (214). The body of the sliding sleeve (214) has a plurality of holes (1000).

Figure 10B:
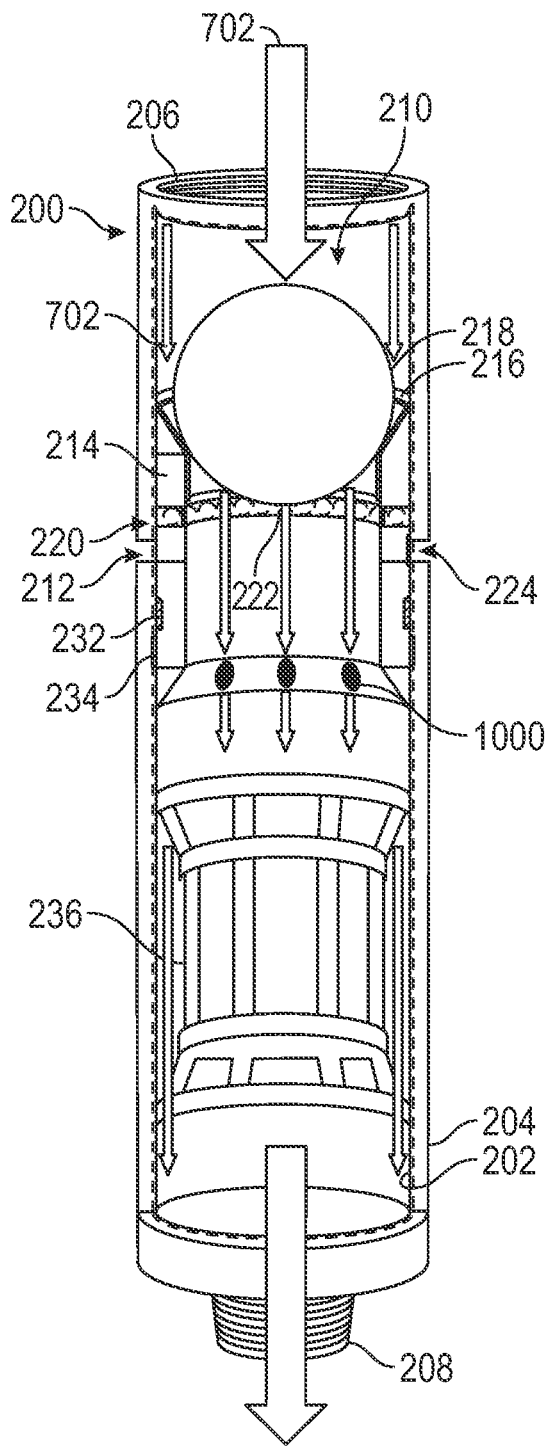

As shown in FIG. 10a, a fluid (702) is able to be pumped through the orifice (210) of the tubular body (200) and the sliding sleeve (214), and the fluid (702) is able to be pumped through the holes (1000) in the body of the sliding sleeve (214). FIG. 10b shows the system in the first position and after a ball (218) has been landed into the ball landing seat (216). Once the ball (218) has landed on the ball landing seat (216), the fluid (702) is unable to flow through the orifice (210) of the sliding sleeve (214) and the tubular body (200).

However, a reduced portion of the fluid (702) is able to flow through the holes (1000) in the body of the sliding sleeve (214). In other words, the ball (218) partially restricts a flow path of the fluid (702) through the sliding sleeve (214) and the tubular body (200). Because the flow path is restricted, a pressure is able to be applied to the ball (218) and the sliding sleeve (214) using the fluid (702).

The fluid (702) pressure may push the sliding sleeve (214) downhole, within the tubular body (200), until the key (232) enters the key seat (234). In accordance with one or more embodiments, one or more tracks (not pictured) are machined into the internal circumferential surface (202) of the tubular body (200) and the sliding sleeve (214) is movably installed on the track(s), and the sliding sleeve (214) may move along the track(s) due to the fluid (702) pressure.

Figure 10C:
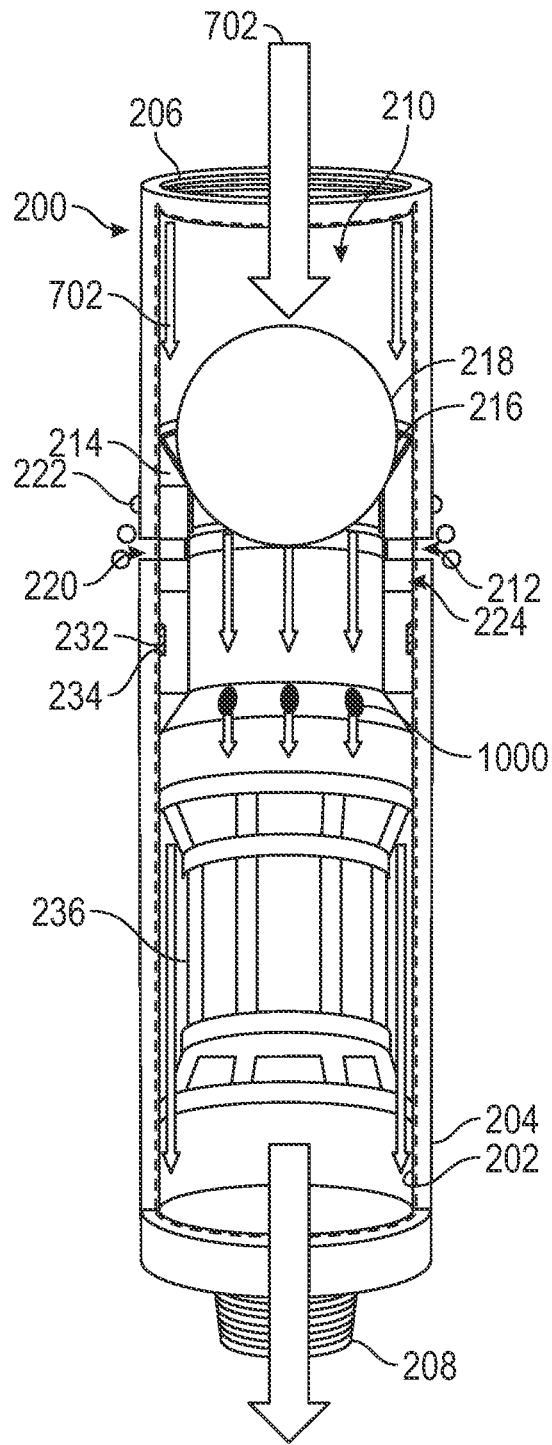

FIG. 10c shows the sliding sleeve (214) in the second position within the tubular body (200) with the ball (218) located in the ball landing seat (216). When the microchip ring (220) is lined up with the exit groove (212), the plurality of microchips (222) may exit the microchip ring (220) and the tubular body (200) into an external environment of the tubular body (200), such as a wellbore (102). In further embodiments, the microchip ring (220) may include a hydraulic piston (800) that uses the fluid (702) to push the microchips (222) out of the microchip ring (220) and into the wellbore (102) as described above in FIGS. 8a-8d.

Figure 10D:
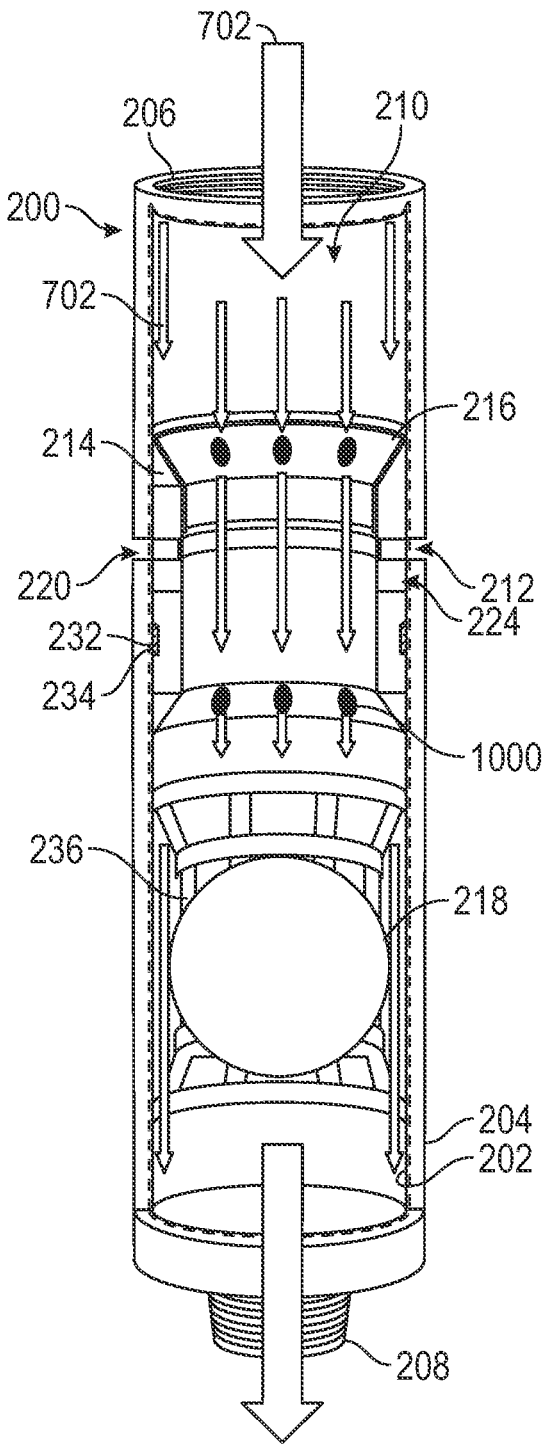

FIG. 10d shows the sliding sleeve (214) in the second position in the tubular body (200) with the ball (218) located in the ball catcher (236). The ball (218) may pass through the sliding sleeve (214) and enter the ball catcher (236) due to the decompression of the sliding sleeve (214) or due to the shearing of the ledge partially blocking the orifice (210) as described above.

Figure 11:
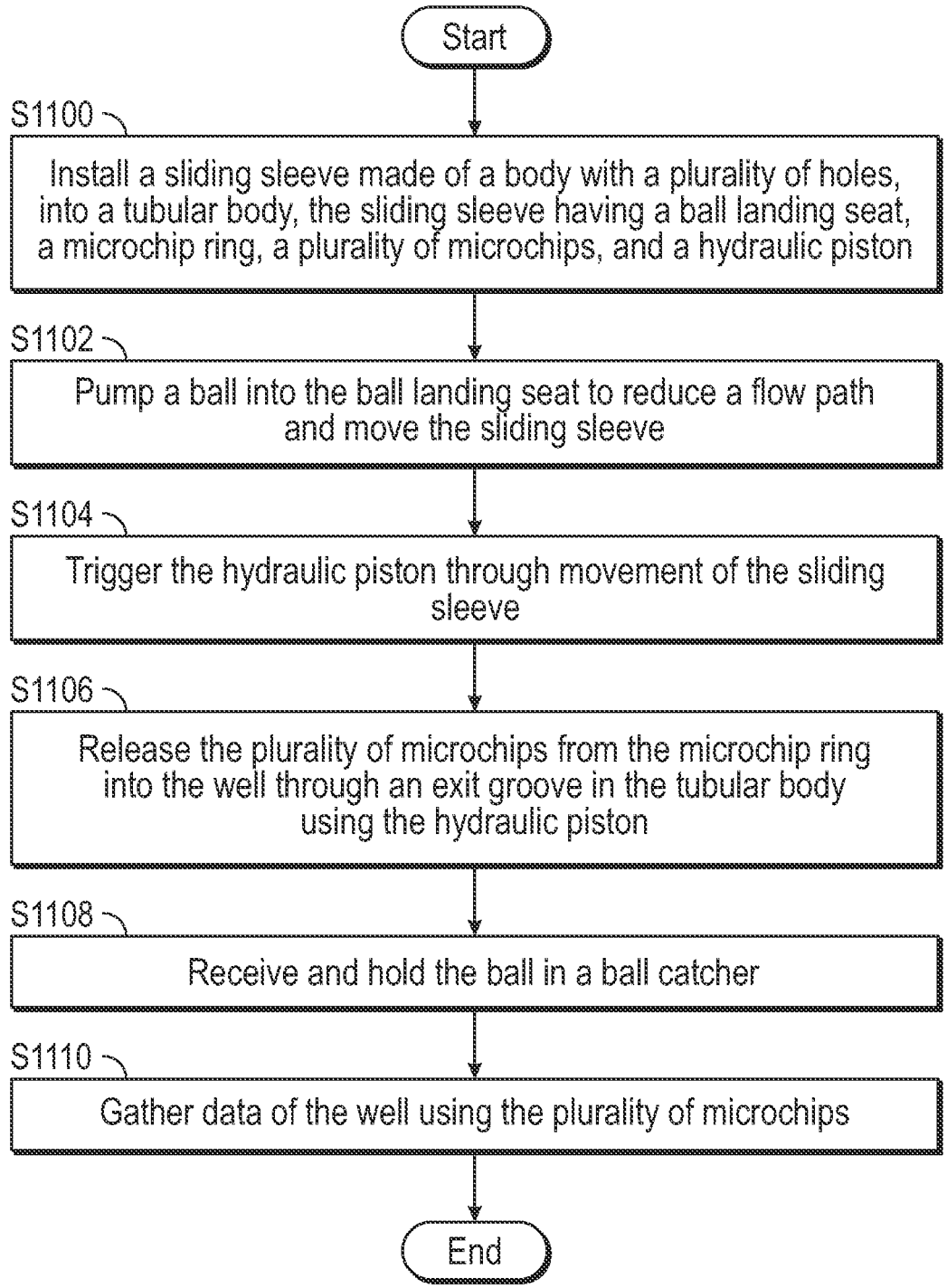
FIG. 11 shows a flowchart in accordance with one or more embodiments.

FIG. 11 shows a flowchart in accordance with one or more embodiments. The flowchart outlines a method for gathering data about a well. The well may be a wellbore (102), as described in FIG. 1, or the well may be any other structure drilled into the surface of the Earth without departing from the scope of the disclosure herein. While the various blocks in FIG. 11 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a sliding sleeve (214), made of a body with a plurality of holes (1000), is installed into a tubular body (200), and the sliding sleeve has a ball landing seat (216), a microchip ring (220), a plurality of microchips (222), and a hydraulic piston (800) (S1100). The sliding sleeve (214) may be installed into one or more tracks machined into the tubular body (200). The tubular body (200), with the sliding sleeve (214), may be installed as part of a drill string (108) using the pin end (208) and the box end (206). The hydraulic piston (800) may be a part of the microchip ring (220) and the microchips (222) may initially be located within the microchip ring (220).

A ball (218) may be pumped into the ball landing seat (216) to reduce a flow path and move the sliding sleeve (214) (S1102). While the ball (218) blocks a fluid (702) from flowing through the orifice (210), the fluid (702) is still able to flow past the sliding sleeve (214) using the holes (1000) in the body of the sliding sleeve (214). The reduction in the flow path allows a pressure to be applied to the ball (218) and the sliding sleeve by the fluid (702). The pressure pushes the sliding sleeve (214) within the tubular body (200).

The hydraulic piston (800) is triggered by the movement of the sliding sleeve (214) (S1104). More specifically, the sliding sleeve (214) aligns the microchip ring (220) with the exit groove (212) in the tubular body (200), thus, the microchips (222) are able to exit the microchip ring (220) into an external environment. As the microchips (222) are free to exit the microchip ring (220), an opening (802) in the hydraulic piston (800) is able to be filled with a fluid (702) and fluid (702) pressure may build.

The build in fluid (702) pressure may enlarge the opening (802). As fluid (702) pressure builds up and enlarges the opening (802), the hydraulic piston (800) pushes against the microchips (222) and the plurality of microchips (222) are released from the microchip ring (220) into the well through the exit groove (212) in the tubular body (200) (S1106). Further, as the sliding sleeve (214) moves within the tubular body (200), a key (232), located on the sliding sleeve (214), may enter a key seat (234) in the tubular body (200).

The ball (218) may pass through the sliding sleeve (214) due to the decompression of the sliding sleeve (214) or due to the shearing of the ledge as described above. After the ball (218) passes through the sliding sleeve (214), the ball (218) is received and held in a ball catcher (236) (S1108). After the microchips (222) exit the microchip ring (220), the microchips (222) gather data of the well (S1110). The well data gathered may be any data that can be obtained by a sensor, such as temperature, pressure, 3D survey data, etc. The data may be retrieved from the microchip (222) when the microchip (222) reaches the surface location with the mud returns.

FIGS. 12a-12e show cut away diagrams of a microchip system during different operational points in accordance with one or more embodiments. Components in FIGS. 12a-12e that are the same as or similar to components shown in the previous figures have not been redescribed for purposes of readability and have the same function and purpose as described above.

Figure 12A:
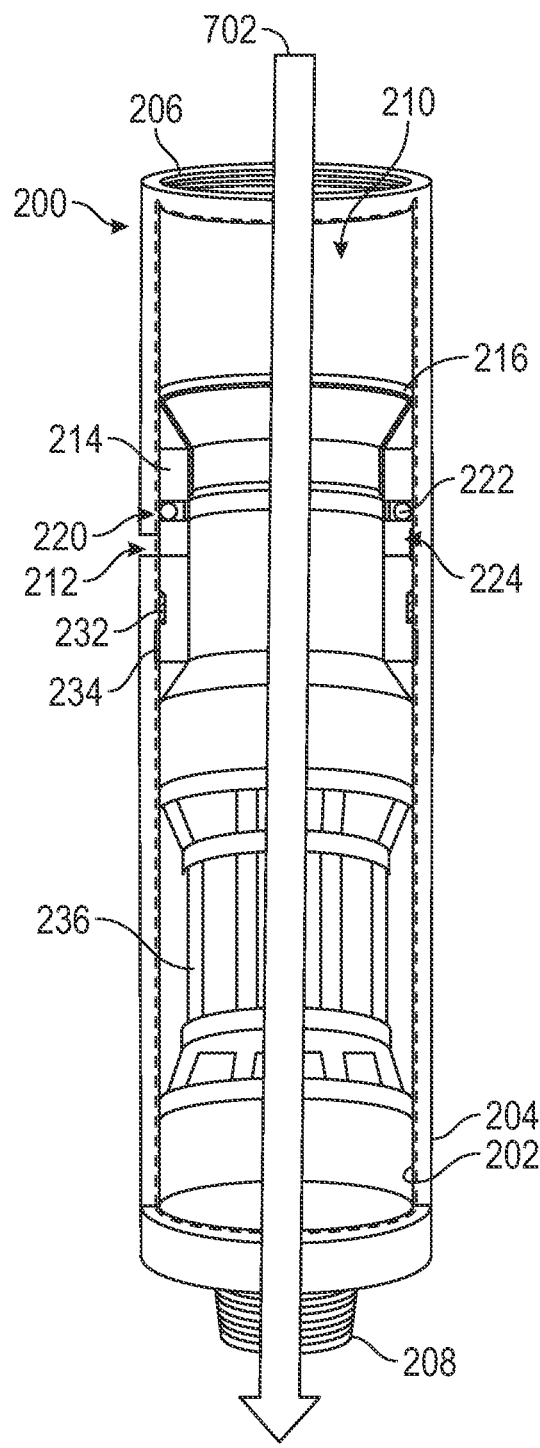
FIGS. 12A-12E show cut away diagrams of a microchip system during different operational points in accordance with one or more embodiments.

Specifically, FIG. 12a shows the sliding sleeve (214) installed within the tubular body (200) and in the first position. The sliding sleeve (214) may include a charging ring (224) and a microchip ring (220) having a plurality of microchips (222). The charging ring (224) may charge and activate the microchips (222). The sliding sleeve (214), as shown in FIGS. 12a-12e, is formed in a cylindrical shape and has the orifice (210) extending through the sliding sleeve (214).

FIGS. 12a-12e show the sliding sleeve (214) having a solid wall body (700). However, the body of the sliding sleeve (214) may be a solid wall body (700) as described in FIGS. 7a-7d, or the body of the sliding sleeve (214) may have a plurality of holes (1000) as described in FIGS. 10a-10c without departing from the scope of the disclosure herein.

Figure 12B:
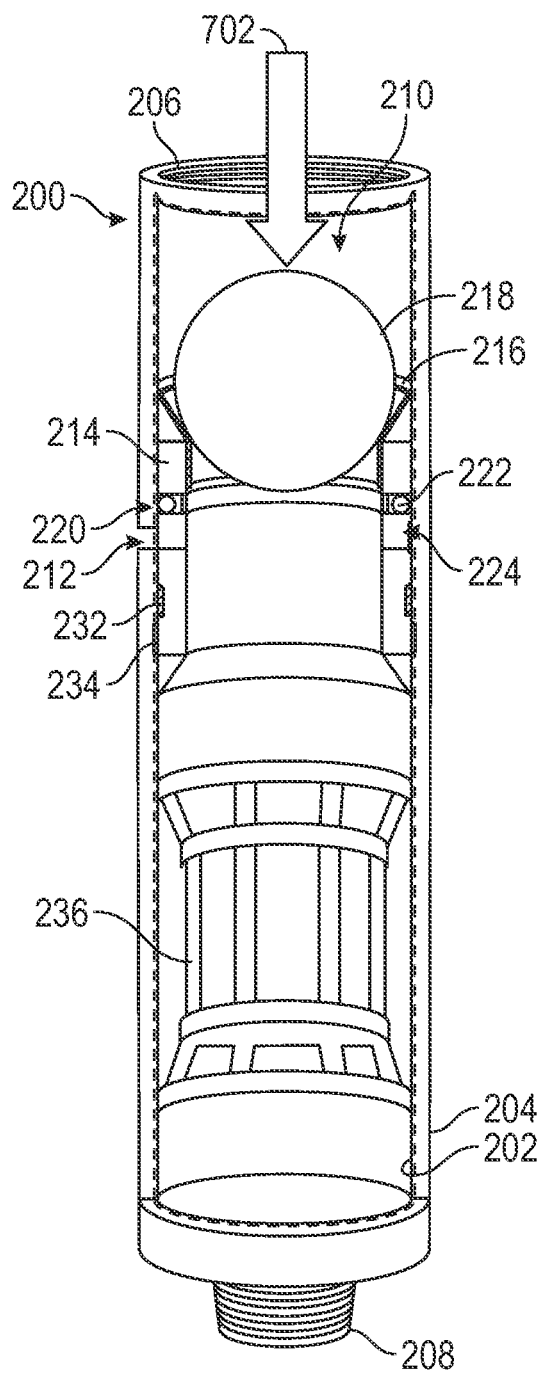

As shown in FIG. 12a, a fluid (702) is able to be pumped through the orifice (210) of the tubular body (200) and the sliding sleeve (214). FIG. 12b shows the system in the first position and after a ball (218) has been landed into the ball landing seat (216). Once the ball (218) has landed on the ball landing seat (216), the fluid (702) is unable to flow through the orifice (210) of the sliding sleeve (214) and the tubular body (200). In other words, the ball (218) blocks a flow path of the fluid (702) through the sliding sleeve (214) and the tubular body (200). Because the flow path is blocked, a pressure is able to be applied to the ball (218) and the sliding sleeve (214) using the fluid (702).

The fluid (702) pressure may push the sliding sleeve (214) downhole, within the tubular body (200), until the key (232) enters the key seat (234). In accordance with one or more embodiments, one or more tracks (not pictured) are machined into the internal circumferential surface (202) of the tubular body (200) and the sliding sleeve (214) is movably installed on the track(s), and the sliding sleeve (214) may move along the track(s) due to the fluid (702) pressure.

Figure 12C:
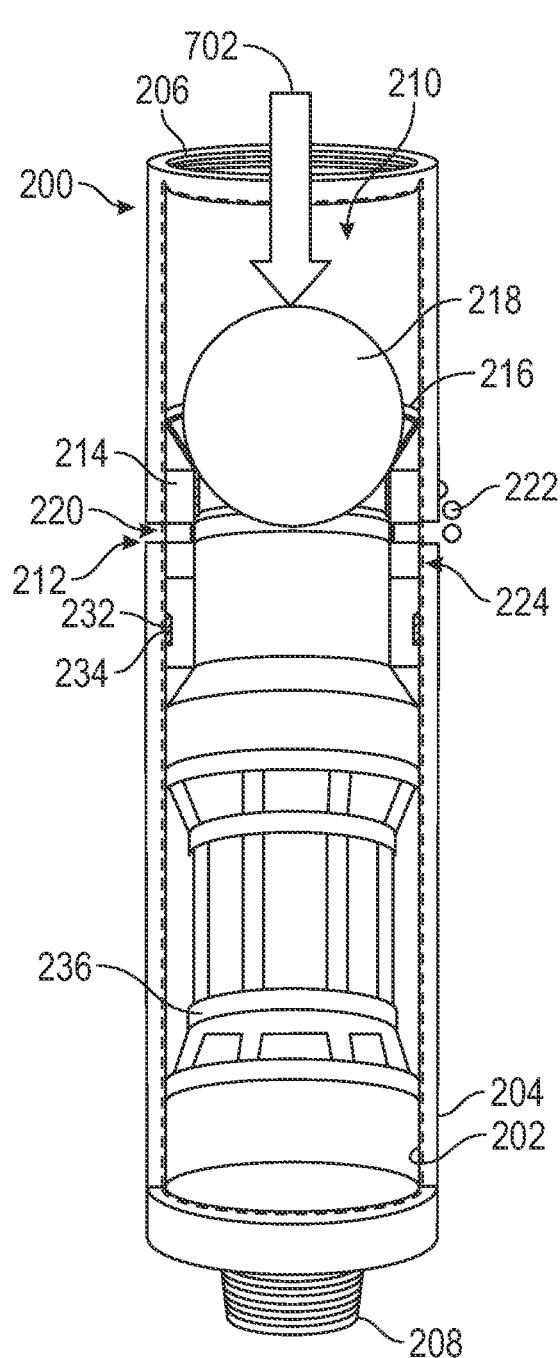

FIG. 12c shows the sliding sleeve (214) in the second position within the tubular body (200) with the ball (218) located in the ball landing seat (216). When the microchip ring (220) is lined up with the exit groove (212), the plurality of microchips (222) may exit the microchip ring (220) and the tubular body (200) into an external environment of the tubular body (200), such as a wellbore (102). In further embodiments, the microchip ring (220) may include a hydraulic piston (800) that uses the fluid (702) to push the microchips (222) out of the microchip ring (220) and into the wellbore (102) as described in FIGS. 8a-8d.

Figure 12D:
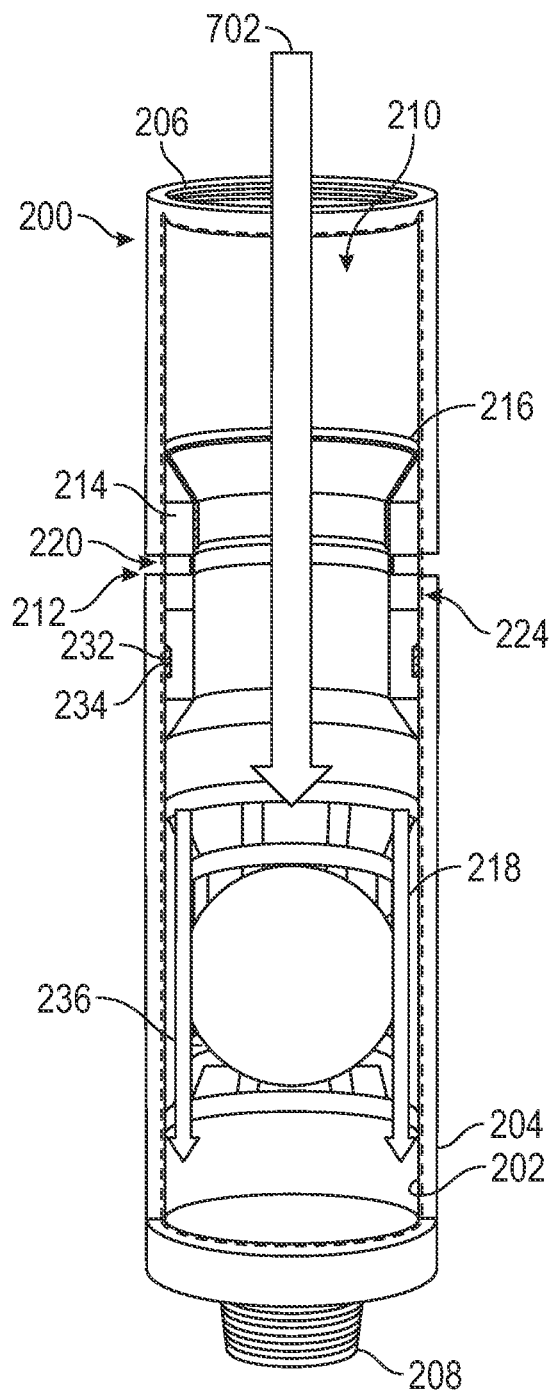
Figure 12E:
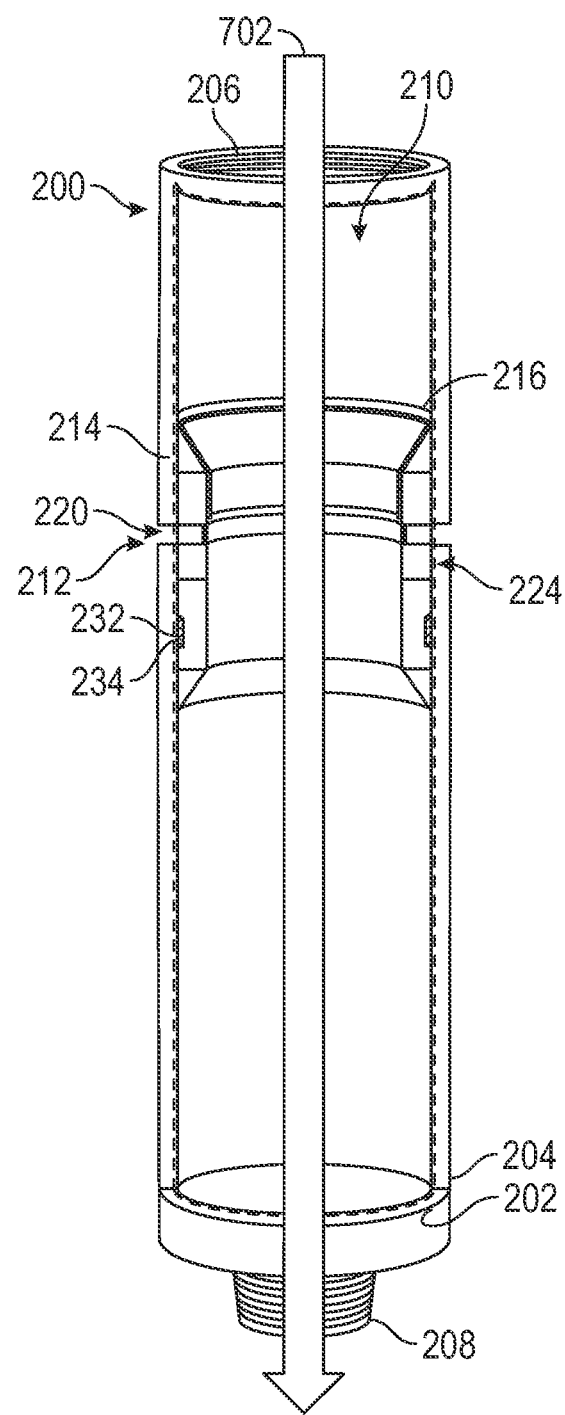

FIG. 12d shows the sliding sleeve (214) in the second position in the tubular body (200) with the ball (218) located in the ball catcher (236). The ball (218) may pass through the sliding sleeve (214) and enter the ball catcher (236) due to the decompression of the sliding sleeve (214) or due to the shearing of the ledge partially blocking the orifice (210) as described above. In accordance with one or more embodiments, the ball (218) and/or the ball catcher (236) may be made out of a dissolvable material. FIG. 12e shows the system after the ball (218) and the ball catcher (236) have been dissolved.

The dissolvable material is designed to dissolve after continued exposure to a fluid (702), such as drilling fluid, at a downhole temperature. The dissolvable ball (218) and dissolvable ball catcher (236) may be made of any suitable dissolvable material such as magnesium alloys, aluminum alloys, polyglycolide (or polyglycolic acid (PGA)), and polylactic acid (PLA), or any of their combinations. In the dissolvable ball (218) scenario, the ball (218) may be solid or hollow. The hollow ball (218) may be assembled from multiple pieces after a traditional machining process.

Alternatively, the hollow ball (218) may be made by additive manufacturing (3D printing). In the hollow ball (218) scenario, solid acid powder may be packed inside the chamber of the ball (218). When the solid acid powder is exposed to the fluid (702) after the hollow ball (218) is, at least, partially dissolved, the drilling fluid is able to expedite the dissolution of the ball (218) and other preferred components, such as the ball catcher (236), to obtain complete flow of the fluid (702) without restriction. The dissolvable materials may be dissolved into powder form or liquid form. The dissolved materials may then be carried out of the well to a surface location by the returning fluid (702).

Figure 13:
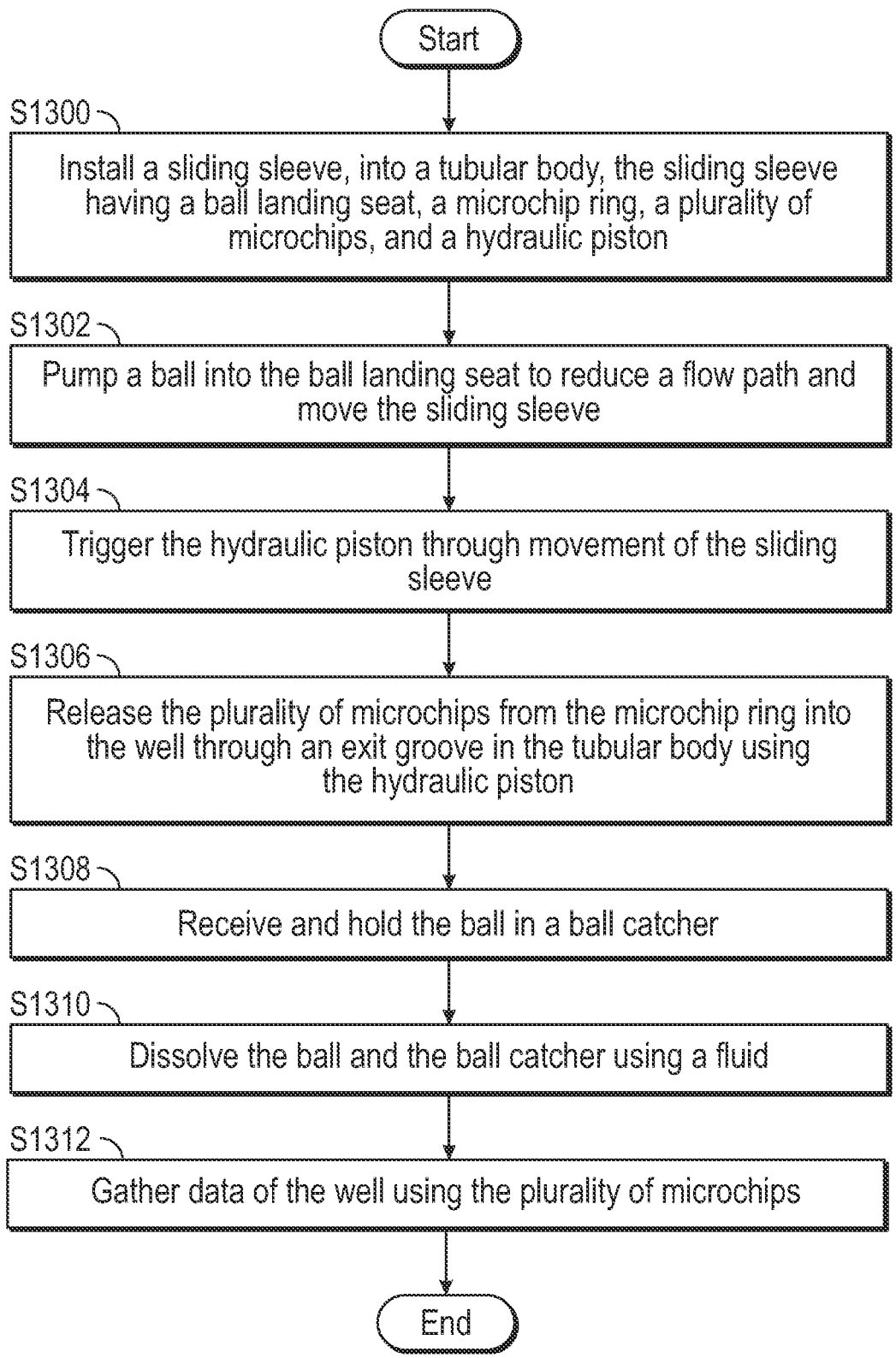
FIG. 13 shows a flowchart in accordance with one or more embodiments.

FIG. 13 shows a flowchart in accordance with one or more embodiments. The flowchart outlines a method for gathering data about a well. The well may be a wellbore (102), as described in FIG. 1, or the well may be any other structure drilled into the surface of the Earth without departing from the scope of the disclosure herein. While the various blocks in FIG. 13 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a sliding sleeve (214) is installed into a tubular body (200), and the sliding sleeve has a ball landing seat (216), a microchip ring (220), a plurality of microchips (222), and a hydraulic piston (800) (S1300). The sliding sleeve (214) may be installed into one or more tracks machined into the tubular body (200). The tubular body (200), with the sliding sleeve (214), may be installed as part of a drill string (108) using the pin end (208) and the box end (206). The hydraulic piston (800) may be a part of the microchip ring (220) and the microchips (222) may initially be located within the microchip ring (220).

A ball (218) may be pumped into the ball landing seat (216) to reduce a flow path and move the sliding sleeve (214) (S1302). The sliding sleeve (214) may be made of a solid wall body, thus, when the ball (218) is pumped into the ball landing seat (216), the flow path is completely blocked. In other embodiments, the sliding sleeve (214) may have a body with a plurality of holes (1000), thus, when the ball (218) is pumped into the ball landing seat (216), the flow path is only partially restricted. The reduction in the flow path, or complete blockage of the flow path, allows a pressure to be applied to the ball (218) and the sliding sleeve (214) by the fluid (702). The pressure pushes the sliding sleeve (214) downhole within the tubular body (200).

The hydraulic piston (800) is triggered by the movement of the sliding sleeve (214) (S1304). More specifically, the sliding sleeve (214) aligns the microchip ring (220) with the exit groove (212) in the tubular body (200), thus, the microchips (222) are able to exit the microchip ring (220) into an external environment. As the microchips (222) are free to exit the microchip ring (220), an opening (802) in the hydraulic piston (800) is able to be filled with a fluid (702) and fluid (702) pressure may build.

The build in fluid (702) pressure may enlarge the opening (802). As fluid (702) pressure builds up and enlarges the opening (802), the hydraulic piston (800) pushes against the microchips (222) and the plurality of microchips (222) are released from the microchip ring (220) into the well through the exit groove (212) in the tubular body (200) (S1306). Further, as the sliding sleeve (214) moves within the tubular body (200), a key (232), located on the sliding sleeve (214), may enter a key seat (234) in the tubular body (200).

The ball (218) may pass through the sliding sleeve (214) due to the decompression of the sliding sleeve (214) or due to the shearing of the ledge as described above. After the ball (218) passes through the sliding sleeve (214), the ball (218) is received and held in a ball catcher (236) (S1308). The ball (218) and the ball catcher (236) are dissolved by the fluid (702) (1310) and full flow may return to the system. After the microchips (222) exit the microchip ring (220), the microchips (222) gather data of the well (S1312). The well data gathered may be any data that can be obtained by a sensor, such as temperature, pressure, 3D survey data, etc. The data may be retrieved from the microchip (222) when the microchip (222) reaches the surface location with the mud returns.

FIGS. 14-18b show different configurations of the microchip ring (220) located in the sliding sleeve (214) in accordance with one or more embodiments. Components in FIGS. 14-18b that are the same as or similar to components shown in the previous figures have not been redescribed for purposes of readability and have the same function and purpose as described above.

Figure 14:
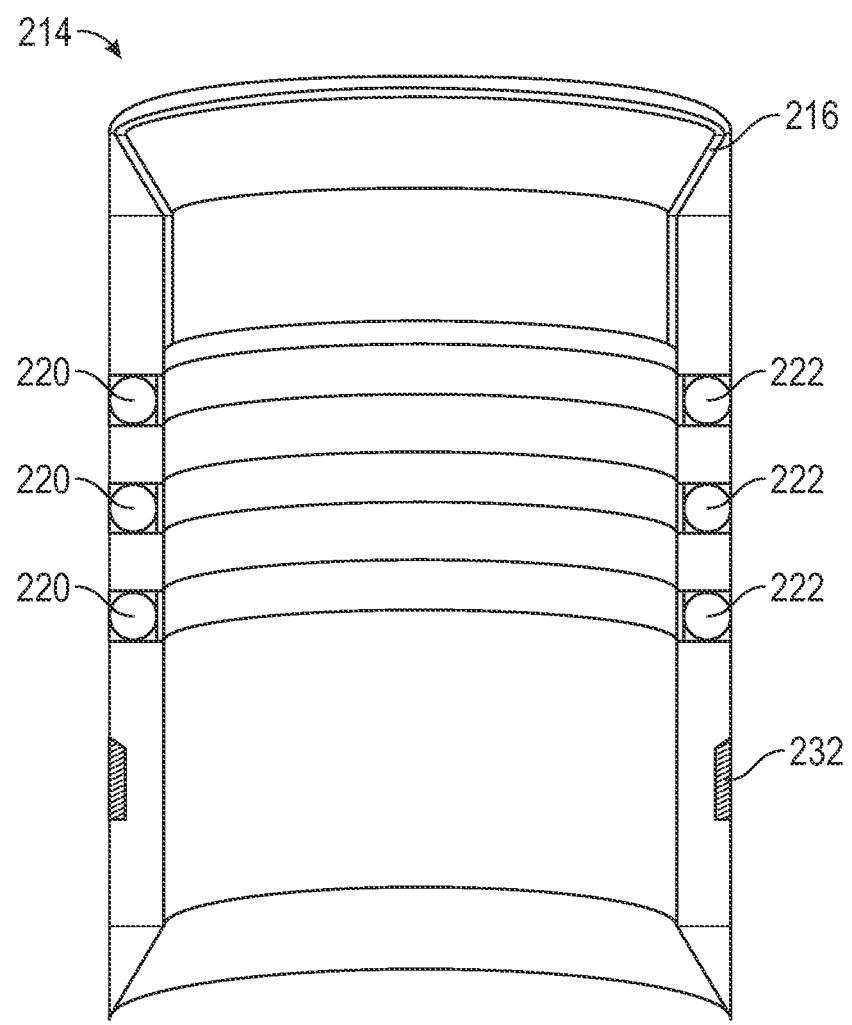

Specifically, FIG. 14 shows a sliding sleeve (214) having a ball landing seat (216) and a key (232). The ball landing seat (216) and the key (232) are located on opposite sides of the sliding sleeve (214). Between the ball landing seat (216) and the key (232) are three microchip rings (220) installed on the sliding sleeve (214). Each microchip ring (220) houses a plurality of microchips (222). Each microchip ring (220) may have a corresponding charging ring (224). The key (232) may be designed to interact with a key seat (234) on a tubular body (200). Each microchip ring (220) may line up with a corresponding exit groove (212) on the tubular body (200). Further, each microchip ring (220) may include a hydraulic piston (800) that aids in releasing the microchips (222) from the microchip ring (220).

FIG. 15a shows a cut away view of a tubular body (200) with a sliding sleeve (214) having a ball landing seat (216) and a key (232). FIG. 15b shows the same tubular body (200) as seen from an external view. The sliding sleeve (214) has a singular microchip ring (220) housing a plurality of microchips (222). A charging ring (224) may be disposed near the microchip ring (220) to charge the microchips (222). When the key (232) is located in the key seat (234) of the tubular body (200), the microchip ring (220) lines up with an exit groove (212) that extends circumferentially around the tubular body (200) as shown in FIG. 15b.

FIG. 16a shows a cut away view of a tubular body (200) with a sliding sleeve (214) having a ball landing seat (216) and a key (232). FIG. 16b shows the same tubular body (200) as seen from an external view. The sliding sleeve (214) has a singular microchip ring (220) housing a plurality of microchips (222). A charging ring (224) may be disposed near the microchip ring (220) to charge the microchips (222). When the key (232) is located in the key seat (234) of the tubular body (200), each microchip (222), in the microchip ring (220), lines up with a corresponding exit groove (212) machined into the tubular body (200) as shown in FIG. 16b.

Figures 17A, 17B:
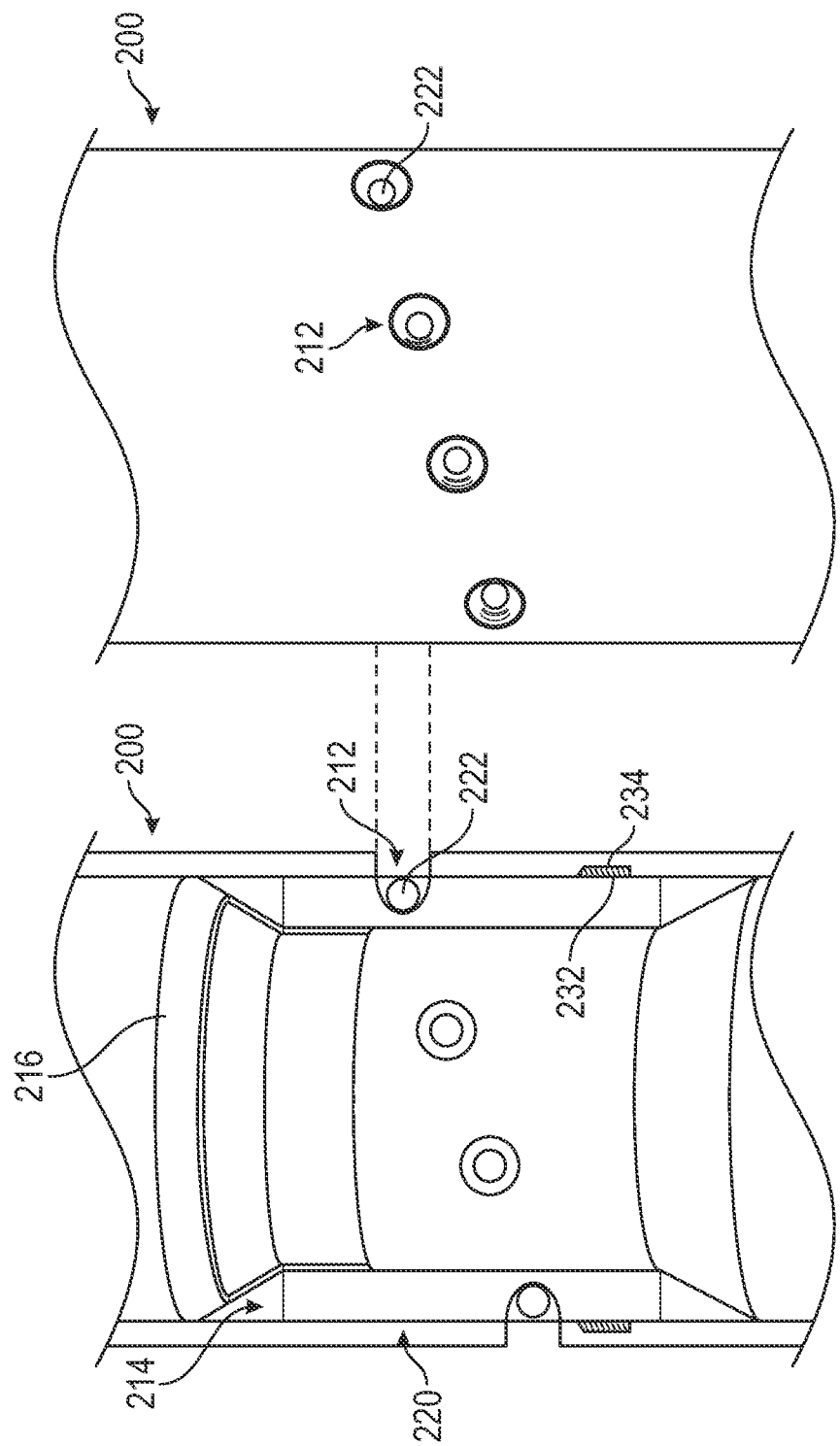

FIG. 17a shows a cut away view of a tubular body (200) with a sliding sleeve (214) having a ball landing seat (216) and a key (232). FIG. 17b shows the same tubular body (200) as seen from an external view. The sliding sleeve (214) has a singular microchip ring (220) housing a plurality of microchips (222). A charging ring (224) may be disposed near the microchip ring (220) to charge the microchips (222). When the key (232) is located in the key seat (234) of the tubular body (200), each microchip (222), in the microchip ring (220), lines up with a corresponding exit groove (212) machined into the tubular body (200) as shown in FIG. 17b. However, none of the microchips (222) nor the exit grooves (212) are located on the same vertical or horizontal plane as one another, and the design of the layout of the microchips (222), in the microchip ring (220), may be similar to a spiral.

FIG. 18a shows a cut away view of a tubular body (200) with a sliding sleeve (214) having a ball landing seat (216) and a key (232). FIG. 18b shows the same tubular body (200) as seen from an external view. The sliding sleeve (214) has a singular microchip ring (220) housing a plurality of microchips (222). A charging ring (224) may be disposed near the microchip ring (220) to charge the microchips (222).

When the key (232) is located in the key seat (234) of the tubular body (200), a set of microchips (222), in the microchip ring (220), lines up with a corresponding exit groove (212) machined into the tubular body (200) as shown in FIG. 18b. None of the exit grooves (212) are located on the same vertical or horizontal plane as one another, and the design of the layout of the exit grooves (212) may be similar to a spiral. Each exit groove (212) may correspond to a set of microchips (222). For example, each exit groove (212) may correspond to three microchips (222) as shown in FIG. 18b.

Figure 19:
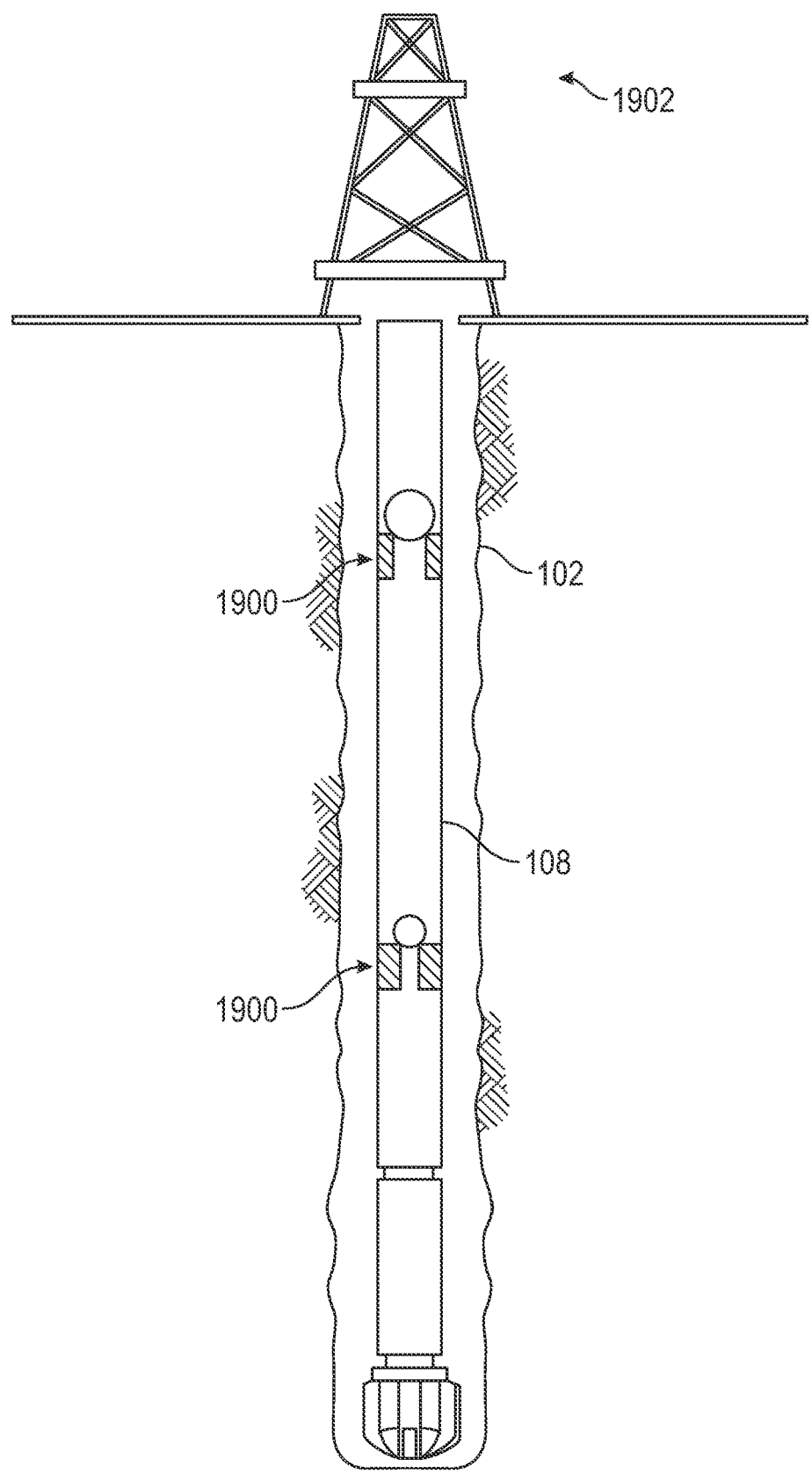
FIG. 19 shows two microchip systems disposed in a drill string in accordance with one or more embodiments.

FIG. 19 shows two microchip systems (1900) disposed in a drill string (108). The drill string (108) is deployed in a wellbore (102) extending from a surface location (1902). Each microchip system (1900) includes a tubular body (200) and a sliding sleeve (214) having a plurality of microchips (222) and a charging ring (224). Components in FIG. 19 that are the same as or similar to components shown in the previous figures have not been redescribed for purposes of readability and have the same function and purpose as described above.

The microchip system (1900) may have the tubular body (200), the sliding sleeve (214), the charging ring (224), and the microchips (222) in any configuration as outlined above without departing from the scope of the disclosure herein. The microchip systems (1900) are installed at different depths along the drill string (108) such that the microchip systems (1900) may deploy the microchips (222) at different depths along the wellbore (102). The microchips (222) may be charged by the charging ring (224) while in the wellbore (102).

The deepest, i.e., furthest downhole, microchip system (1900) may be designed to be activated using a ball (218) having a smaller size than the ball (218) used to activate the shallower microchip system (1900). The balls (218) may have different diameters such that the deeper ball (218) may pass through the sliding sleeve (214) of the shallower microchip system (1900) before landing on the ball landing seat (216) of the deeper microchip system (1900). When the corresponding ball (218) lands in either ball landing seat (216), a pressure may be applied to the ball (218) using a fluid (702). The pressure moves the sliding sleeve (214) within the tubular body (200).

The movement of the sliding sleeve may activate the microchips (222) and release the microchips (222) into the wellbore (102). The microchips (222) may be activated by a circuit (226), having a chip motion sensor (508), located in the charging ring (224). Upon activation, the microchips (222) may begin to gather well data. The microchips (222) may be circulated to the surface location (1902) using the fluid (702) and the data may be gathered from the microchips (222) using a microchip reader.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system for a well comprising:
    a sliding sleeve made of a body with a plurality of holes, the sliding sleeve installed within a tubular body having an exit groove;
    a ball landing seat formed by the sliding sleeve;
    a plurality of microchips housed in a microchip ring installed within the sliding sleeve;
    a hydraulic piston installed within the microchip ring, triggered by reception of a ball in the ball landing seat, the ball reducing a cross sectional area of a flow path, wherein the hydraulic piston releases the plurality of microchips through the exit groove and into the well to gather data; and
    a ball catcher configured to receive and hold the ball after the plurality of microchips are released into the well.

2. The system of claim 1, wherein a track is machined into the tubular body and the sliding sleeve is movably installed on the track.

3. The system of claim 2, wherein a pressure is applied to the ball, landed in the ball landing seat, by a fluid to trigger movement of the sliding sleeve along the track.

4. The system of claim 1, wherein movement of the sliding sleeve allows a fluid to enter an opening in the hydraulic piston.

5. The system of claim 4, wherein the fluid applies a pressure against the hydraulic piston to move the hydraulic piston and push the plurality of microchips out of the exit groove.

6. The system of claim 5, wherein the hydraulic piston pushes the plurality of microchips in a clockwise direction.

7. The system of claim 1, further comprising a key seat installed within the tubular body, configured to receive a key installed on the sliding sleeve.

8. The system of claim 7, wherein reception of the key in the key seat allows the ball to pass through the sliding sleeve and land in the ball catcher.

9. The system of claim 1, wherein the tubular body comprises a pin end and a box end which mate with a corresponding box end and a corresponding pin end, respectively, of a drill string.

10. The system of claim 1, further comprising a plurality of microchip rings installed within the sliding sleeve.

11. A method for a well, the method comprising:
    installing a sliding sleeve, made of a body with a plurality of holes, into a tubular body, the sliding sleeve having a ball landing seat, a microchip ring, a plurality of microchips, and a hydraulic piston;
    pumping a ball into the ball landing seat to move the sliding sleeve, the ball reducing a cross sectional area of a flow path;
    triggering the hydraulic piston through movement of the sliding sleeve;
    releasing the plurality of microchips from the microchip ring into the well through an exit groove in the tubular body using the hydraulic piston;
    receiving and holding the ball in a ball catcher; and
    gathering data of the well using the plurality of microchips.

12. The method of claim 11, wherein installing the sliding sleeve into the tubular body comprises installing the sliding sleeve into a track machined into the tubular body.

13. The method of claim 12, wherein pumping the ball into the ball landing seat to move the sliding sleeve further comprises applying a pressure to the ball, landed in the ball landing seat, using a fluid to move the sliding sleeve along the track.

14. The method of claim 11, wherein triggering the hydraulic piston through movement of the sliding sleeve comprises enlarging an opening in the microchip ring.

15. The method of claim 14, wherein triggering the hydraulic piston through movement of the sliding sleeve further comprises pumping a fluid into the opening of the microchip ring to move the hydraulic piston and push the plurality of microchips out of the exit groove.

16. The method of claim 15, wherein the hydraulic piston pushes the plurality of microchips in a clockwise direction.

17. The method of claim 11, wherein receiving and holding the ball in the ball catcher comprises receiving a key, installed on the sliding sleeve, in a key seat, installed within the tubular body.

18. The method of claim 17, wherein receiving the key, installed on the sliding sleeve, in the key seat, installed within the tubular body, further comprises pumping the ball through the sliding sleeve to be landed in the ball catcher.

19. The method of claim 11, further comprising installing the tubular body in a drill string using a pin end and a box end.

20. The method of claim 11, further comprising installing a plurality of microchip rings within the sliding sleeve.

* * * * *